United States Patent
Stothers

(10) Patent No.: US 12,467,496 B2
(45) Date of Patent: Nov. 11, 2025

(54) IN, OR RELATING TO, FASTENERS

(71) Applicant: Rack Studs Limited, Auckland (NZ)

(72) Inventor: Peter Allan Stothers, Auckland (NZ)

(73) Assignee: Rack Studs Limited, Auckland (NZ)

( * ) Notice: Subject to any disclaimer, the term of this patent is extended or adjusted under 35 U.S.C. 154(b) by 475 days.

(21) Appl. No.: 17/769,439

(22) PCT Filed: Aug. 11, 2020

(86) PCT No.: PCT/NZ2020/050088
§ 371 (c)(1),
(2) Date: Apr. 15, 2022

(87) PCT Pub. No.: WO2021/075980
PCT Pub. Date: Apr. 22, 2021

(65) Prior Publication Data
US 2022/0412388 A1 Dec. 29, 2022

(30) Foreign Application Priority Data

Oct. 18, 2019 (NZ) ........................................ 758356

(51) Int. Cl.
*F16B 33/00* (2006.01)
*H05K 7/14* (2006.01)
(52) U.S. Cl.
CPC ......... *F16B 33/002* (2013.01); *H05K 7/1401* (2013.01); *F16B 2200/20* (2018.08)
(58) Field of Classification Search
CPC ................ F16B 33/002; F16B 2200/20; F16B 2200/205; F16B 37/043; F16B 41/002;
(Continued)

(56) References Cited

U.S. PATENT DOCUMENTS 1,881,836 A * 10/1932 Mitchell ............... F16B 37/043
411/173
2,888,971 A * 6/1959 Wootton ................... F16B 5/06
248/214
(Continued)

FOREIGN PATENT DOCUMENTS

CN        107249276 A    10/2017
WO    2018/102838 A1    6/2018

OTHER PUBLICATIONS

HPST—High-Power Stud Terminals—Hsk 16-120MM—Conta-Clip—https://www.oem.co.uk/products/panel/terminals/stud-terminals-_-426988/high-power-stud-terminals---hsk-16-120mm--_-125485; Visited Jan. 26, 2023.

(Continued)

*Primary Examiner* — Jason W San
*Assistant Examiner* — Rowland Do
(74) *Attorney, Agent, or Firm* — Anderson Patent Law Firm

(57) ABSTRACT

A rack fastener is provided to engage and retain a first member and hold a second member to the first member. The fastener has two coextensive studs, each having base portions, to install from a back surface of the first member each into separate apertures thereof, such that the studs extend through the separate apertures from a front surface of the first member. A connecting portion connects the two base portions. There is also, a clipping portion extending, directly or indirectly, from one of the base portions, the clipping portion having at least one engagement face to engage a region of another aperture of the first member so that the fastener is substantially prevented from being separated from the first member. The two studs can pass through respective apertures of the second member, and thereafter (Continued)

fasteners can engage each stud to secure the second member to the first member.

19 Claims, 18 Drawing Sheets

(58) Field of Classification Search
CPC ....... F16B 41/00; A47B 88/43; H05K 7/1489; H05K 7/1401; H05K 7/1407; H05K 7/1411; H05K 7/1405; F15B 5/0208; F15B 5/0685
USPC ................ 411/87, 97, 99, 107, 112
See application file for complete search history.

(56) References Cited

U.S. PATENT DOCUMENTS

| | | | | |
|---|---|---|---|---|
| D294,676 S * | 3/1988 | Egner | ............. | D8/382 |
| 4,753,560 A * | 6/1988 | Ryder | ............. | B60R 19/26 |
| | | | | 411/908 |
| D356,729 S * | 3/1995 | Kassouni | ............. | D8/387 |
| 5,407,310 A * | 4/1995 | Kassouni | ............. | F16B 35/06 |
| | | | | 411/173 |
| 5,791,627 A * | 8/1998 | Fisch | ............. | B60K 5/00 |
| | | | | 248/222.13 |
| 6,840,388 B2 * | 1/2005 | Mayer | ............. | H05K 7/1491 |
| | | | | 211/26 |
| 6,886,799 B2 * | 5/2005 | Yamanashi | ............. | B60H 1/00535 |
| | | | | 248/300 |
| 7,490,442 B1 * | 2/2009 | Jackson | ............. | E06B 1/6053 |
| | | | | 52/214 |
| 7,527,464 B2 * | 5/2009 | Stewart | ............. | F16B 37/043 |
| | | | | 411/970 |
| 7,641,297 B2 * | 1/2010 | Huang | ............. | H05K 7/1489 |
| | | | | 312/334.4 |
| 7,731,142 B2 | 6/2010 | Chen et al. | | |
| 8,727,138 B2 * | 5/2014 | Dittus | ............. | H05K 7/183 |
| | | | | 312/334.4 |
| 9,175,479 B2 * | 11/2015 | Stanley | ............. | F24F 3/0442 |
| 12,308,627 B2 * | 5/2025 | Partridge | ............. | F16B 37/047 |
| 2004/0094492 A1 * | 5/2004 | Greenwald | ............. | H05K 7/1421 |
| | | | | 211/26 |
| 2004/0104184 A1 * | 6/2004 | Hartman | ............. | G06F 1/183 |
| | | | | 211/192 |
| 2004/0218368 A1 | 11/2004 | Velez et al. | | |
| 2005/0285493 A1 * | 12/2005 | Hu | ............. | A47B 88/43 |
| | | | | 312/334.4 |
| 2006/0274508 A1 | 12/2006 | LaRiviere et al. | | |
| 2007/0145220 A1 | 6/2007 | Foster, Sr. et al. | | |
| 2009/0167127 A1 * | 7/2009 | Chen | ............. | A47B 88/43 |
| | | | | 312/334.1 |
| 2010/0200523 A1 | 8/2010 | Henderson | | |
| 2010/0243586 A1 * | 9/2010 | Henderson | ............. | H05K 7/1489 |
| | | | | 248/220.21 |
| 2013/0112638 A1 | 5/2013 | Dittus et al. | | |
| 2014/0363109 A1 | 12/2014 | Chen et al. | | |
| 2014/0366335 A1 | 12/2014 | Stothers | | |
| 2015/0027968 A1 | 1/2015 | Murakami | | |
| 2017/0196354 A1 | 7/2017 | Chen et al. | | |
| 2017/0290424 A1 * | 10/2017 | Chen | ............. | A47B 88/43 |

OTHER PUBLICATIONS

SWH Solar Racking Product Catalog—SWH Solar Warehouse; Jan. 1, 2014 Version; www.esolarwarehouse.com.

\* cited by examiner

IN, OR RELATING TO, FASTENERS

TECHNICAL FIELD OF THE INVENTION

The present invention relates to fasteners.

In particular, though not solely, the present invention is directed to fasteners for equipment that may need retention into a rack like mount, for example as used in information technology, telecommunication, security, or audio rack mounted systems.

BACKGROUND OF THE INVENTION

There is often the requirement to mount or attach equipment to a structure, such as for example in information technology, telecommunication, security, or audio equipment in a rack, typically referred to as rack mount, or server racks. The racks normally are formed from 2 or 4 vertical elongate structures to form a cabinet type arrangement. Typically, the elongate structure is formed from thin sheet steel.

Such racks are, or can be closed on the sides, top, bottom, back and the front can have a door. When the rack is empty or near empty then access to mount fasteners is available. However, when equipment is in place, as either the rack is populated, or when populated and new equipment needs installing, then access to mount fasteners is often restricted.

As such, while it is possible to access any side by removing panels or similar, or removing and replacing existing equipment, it is often inconvenient, at least from a time perspective. Further, when a rack is mounted next to a wall, another cabinet, or a further enclosure this again may not be possible, or very time consuming.

The backside is normally reserved for electrical and network connections and similar. Reaching through from the rear, if the backside of the rack is accessible can be difficult as the racks can be 700 mm, or more, deep. When populated, the gaps between installed equipment can be only 50 mm or so high, so reaching deep into that narrow a slot is difficult or impossible.

Further, when adding or removing, or replacing equipment to or in the rack it is desirable to achieve this as quickly as possible. This may be because systems need powering down before equipment is added or removed, or because there is a short time frame to add or remove the equipment. It is also desirable to make the mechanical physical fastenings, convenient and as secure but as quick as possible.

As such, the most desirable and convenient way to install and remove fasteners to then mount the equipment is from the front.

The at least two structures, typically vertical, that form the front of the rack normally have a series of regularly spaced apertures on the front presenting vertical face. These apertures are to secure, via fasteners, the equipment to the rack. The access to these apertures is easiest from the front for the reasons set out above. However when the rack is not populated, or there is a space between equipment already mounted in the rack then it can be possible to insert fasters from behind the front presenting vertical face, that is accessing from the front, but reaching around the structure to insert the fastener.

The regularly spaced apertures correspond to a standard referred to as a rack unit. Typically, racks are described as being a set number of rack units high, thus a user can tell whether a cabinet is suitable for the number of pieces of equipment they need to install. Typically a 1RU (one rack unit) piece of equipment uses a total of four fasteners, two on each side of the equipment mounting it to the rack. More fasteners may be used depending on the size and weight of the piece of equipment. As such, at least four fasteners must be used to secure the equipment to the rack. Therefore, there is also an advantage to be gained if the speed by which these four or more fasteners can be positioned and the equipment then mounted.

A traditional solution would be to use a bolt and a nut for each fastening point, thus for example four bolts and four nuts. The nuts would have to be held in place, the equipment held in place against the rack, and then the bolts inserted and tightened. This may work for the initial pieces of equipment, or when there are multiple technicians present. However, once populated access behind the rack, even at the front, for small nuts is difficult. Further, there is often only a single technician present, especially when servicing or replacing equipment. This this solution is not desirable.

There is therefore the need for a fastener for use where it is convenient or only possible, to access one side; that is the front side for example, of equipment that needs fastening to such structures or racks. This is opposed to a normal fastener arrangement where, for example, a user passes a bolt through one side and fastens a nut to it on the other.

The modularity of such racks and the equipment connected thereto has resulted in a number of solutions to this problem for rack mounting in the telecommunications, IT, security and professional audio industries.

One solution is referred to typically as the cage nut. This is often a threaded nut that has a spring steel cage around it. The cage around the nut holds the nut from rotating, and the cage can hook into the aperture of the rack. The user then holds the equipment in place and then inserts the fastener, typically a Philips head bolt, to mount the equipment to the rack.

A captive fastener solution is shown in U.S. Pat. No. 6,682,282 and US20050019133. This shows a captive bolt of one thread size which can be switched for a bolt of another thread size by releasing the bolt from a removable retainer. They are used for fastening rack mount panels to equipment racks. These solutions at least have the disadvantage that they must be supplied already attached to the equipment to be installed. Thus whilst they are always attached to the equipment, there will be surplus such fasteners, for example sitting on equipment that is not installed. They also require custom mounts and therefore are not readily adaptable or transferable between pieces of equipment.

Other solutions to aid the accessibility issue are blind nuts to sit behind the front face of the structure such as that shown in U.S. Pat. No. 6,538,894 for a front insertion fastener. This shows a front inserted nut that deforms to capture the structure between a front flange and rear wings that deform laterally to the main axis of the nut. The front flange has a return to engage with the structure edge to reduce rotation while tightening. The rear portion of the nut has a flange that engages with the rear side of the structure also due in part to deformation. Such solutions remove or reduce the need to access the rear of the structure. However, because they deform plastically and therefore permanently they present difficulty in removing in the same way they are inserted and may not be reusable.

Such cage, blind or captive nuts as described above also have the disadvantage as they can easily be lost down or within the rack. These also often require specialist tools to install and remove, or when done by hand, have sharp edges that can cut or otherwise injure a user, or damage equipment.

A latch style fastener is shown in GB 1123733 where a knurled knob operates a latch tongue to engage and disengage the equipment from the structure. This is an easy way to engage and disengage the equipment from the rack. However, it again requires specialist fitting on the equipment and/or the rack.

Side mounting and engaging equipment is shown in U.S. Pat. No. 6,353,542. This shows a rack mounting bracket for mounting heavy unbalanced equipment. This rack mounting system is for either side of a piece of equipment that clamps the racks. This system holds the equipment securely but requires additional brackets, has added clearance and bulk issues and may require access from the side.

A number of these solutions also have sharp edges so they can easily damage equipment that is slide in and out past them, especially when the equipment is heavy and/or the rack is high populated with little room to move.

These solutions also require a degree of balancing equipment and aligning the mounting apertures on the equipment with the apertures in the rack, while the fastener, for example a bolt, is brought into location to mount the equipment. This is undesirable when the equipment is heavy or the rack is populated and can result in equipment damage and/or operator injury, particularly when it is considered that often the equipment needs at least four such fasteners to securely mount it.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved fastener, or to provide an improved fastener that is easy to install without specialist tools, and that can speed up installation and reduce injury or equipment damage, that is as secure as needed, overcome the above shortcomings or address the above desiderata, or to at least provide the public with a useful choice.

BRIEF DESCRIPTION OF THE INVENTION

In a first aspect the present invention consists in a rack fastener adapted to engage, and be retained to, a first member and then hold a second member to the first member, comprising or including, A first stud having a first base portion, adapted to install from a back surface of the first member into a first aperture thereof, such that the first stud extends through the first aperture, and extends from a front surface of the first member, A second stud having a second base portion, adapted to install from the back surface of the first member into a second aperture thereof, such that the second stud extends through the second aperture, and extends from the front surface of the first member, the second stud parallel to, and co-extensive with, the first stud, A connecting portion connecting the first base portion to the second base portion, A clipping portion extending, directly or indirectly, from the first base portion, the clipping portion having at least one engagement face to engage a region of a third aperture of the first member so that the fastener is substantially prevented from being separated from the first member, Such that the first stud and second stud can pass through respective apertures of the second member, and thereafter a first fastener can engage the first stud, and a second fastener can engage the second stud to secure the second member to the first member.

Preferably the at least one engagement face is located to extend through the third aperture.

Preferably there are two or more engagement faces, opposed to each other and biased apart to engage with opposing regions of the third aperture to retain the fastener to the first member.

Alternatively the at least one engagement face is biased to interact with one or more of the first base portion or second base portion to retain the fastener to the first member.

Preferably the third aperture is between the first aperture and the second aperture.

Preferably the first stud and the second stud are elongate.

Preferably first stud and the second stud have a patterned engagement to engage the first fastener and second fastener thereon.

Preferably the patterned engagement is a thread to receive the first fastener and second fastener respectively.

Preferably the first stud and the second stud have reduced or no thread profile on their upper facing regions, at least when installed in the first member.

Preferably the first stud and the second stud have reduced or no thread profile on their upper and lower facing regions, in case the fastener are installed upside down.

Preferably the first base portion and or the second base portion have a boss portion that engages into the first aperture and or second aperture respectively to limit movement of the fastener within a major plane of the first member.

Preferably the first base portion and the second base portion each have a respective boss portion.

Preferably the first stud extends from a first boss portion, and the second stud extends from a second boss portion.

Preferably that part of the first stud and second stud, proximal their respective boss portions has no thread and is of increased diameter, compared to the threaded portion, the increased diameter to increase the strength of the studs where the second member will sit when engaged therewith.

Preferably the first base portion and or the second base portion include a peripheral skirt to lie outside a periphery of the first aperture and or second aperture, and against the back surface.

Preferably the engagement face is biased to engage the region of the third aperture by a tongue portion that curves away from, and then back to, the back surface.

Preferably the connecting portion is looped and has sufficient space to receive one or more fingers of a user therein to enable handling and attachment or removal of the fastener to the first member.

Alternatively a user can engage the tongue portion with their fingers to enable handling and attachment or removal of the fastener to the first member.

Preferably the engagement face has at least one extension to engage over the front surface of the first member.

Preferably the engagement face has at least one extension to engage behind the back surface or the front surface of the first member.

Preferably there are two engagement faces biased away from each other by the tongue portion to each engage an opposing region of the third aperture.

Preferably the fastener can be disengaged from the first member by disengaging the, or at least one of the, engagement faces from its respective region.

Preferably the fastener is made from a glass fibre reinforced plastic such as nylon or similar plastics material, for example that sold under the GRIVORY™ brand.

Preferably the fastener is able to be reused.

Preferably the fastener is dimensioned so as to fit the first aperture, second aperture or third aperture regardless of whether those apertures inner periphery is rectilinear or curved.

Preferably the second member sits between the first member and the first and second fasteners.

Preferably the first member is part of a rack system, and the second member is a piece of equipment to be secured in the rack system.

Preferably the clipping portion can be pinched by a user's fingers to engage and disengage the clipping portion from the third aperture.

Preferably the fastener is a unitary item.

Preferably the fastener is formed by injection moulding, additive manufacturing, or subtractive manufacturing.

Preferably the clipping portion and or connecting portion forms a rearward facing surface of the fastener for a user to push and engage at least the clipping portion with the first member.

Preferably the clipping portion has a contour on at least part of the rearward surface to indicate to a user an orientation of the rack fastener.

Preferably the contour serves to indicate to the user the orientation of the rack fastener and by feel how to insert and remove the rack fastener.

Preferably the first base portion and the second base portion also form part of the rearward facing surface.

Preferably there is at least one reinforcing rib to strengthen the connection between the first base portion, second base portion and the connecting portion.

Preferably the at least one reinforcing rib extends from a rear of the first base portion, second base portion and the connecting portion, away from the back surface.

Preferably the at least one reinforcing rib is on a periphery of the first base portion, second base portion and the connecting portion.

Preferably there are two reinforcing ribs.

Preferably the first base portion, second base portion and the connecting portion present a planar surface to the back surface.

Preferably the thread on the first stud and second stud only extends partway down, and there is a smooth surfaced portion between the thread and the boss portion.

Preferably the first stud and second stud have their centre lines offset from a centre line of their respective boss portions.

Preferably the tongue portion sits within an aperture between the first base portion, second base portion and the connecting portion, such that there is a free end containing the engagement face, the free end able to move within the aperture to allow engagement to, and disengagement from, the first member.

Preferably the other engagement face is on an extension of the tongue portion or clipping portion from the first base portion.

Preferably the engagement face or faces are located on extensions of the clipping portion.

Preferably the engagement faces include one or more reliefs to engage the third aperture.

Preferably the clipping portion has one or more returns on distal ends of the clipping portion, to over-engage the front surface of the third aperture.

Preferably there is a direction indicator on a forward presenting surface of the fastener to indicate to a user which is the preferred installation orientation.

Preferably the direction indicator is at least one arrow indicating the preferred upwards installation orientation.

Preferably one engagement face is narrower than the other engagement face.

In a further aspect the present invention consists in a rack fastener adapted to engage and be retained to a first member and then hold a second member to the first member, comprising or including, A first stud and a second stud joined by a connecting portion from behind, the first stud and second stud to pass through, from a back surface, a respective first aperture and second aperture of the first member, to then extend from a front surface of the first member, A clipping portion to engage with a third aperture to selectively retain the rack fastener to the first member, Whereby the second member can then be secured to the first member via the first stud and second stud passing through the second member, and a first fastener and second fastener then engaging the first stud and second stud.

In another aspect the present invention consists in a method of securing a first member to a second member using a fastener, comprising or including the steps of, Passing the fastener behind a back surface of the first member, Moving the fastener such that a first stud and a second stud of the fastener pass through a respective first aperture and second aperture in the first member, such that the first stud and second stud then extend at least in part past a front surface of the first member, the first stud and the second stud connected, directly or indirectly by a connecting portion there between, Retaining the fastener to the first member via a clipping portion, connected directly or indirectly to the first stud, engaging with a third aperture in the first member, Such that a user may mount a second member over the first and or second stud, and thereafter mount a first fastener to the first stud, and or a second fastener to the second stud to thus secure the second member to the first member.

Preferably the method includes the step of adding a second fastener to a second first member, parallel to the first member.

Preferably at least one engagement face is located to extend through the third aperture.

Preferably there are two or more engagement faces, opposed to each other and biased apart to engage with opposing regions of the third aperture to retain the fastener to the first member.

Alternatively the at least one engagement face is biased to interact with one or more of the first base portion or second base portion to retain the fastener to the first member.

Preferably the third aperture is between the first aperture and the second aperture.

Preferably the first stud and the second stud are elongate.

Preferably first stud and the second stud have a patterned engagement to engage the first fastener and second fastener thereon.

Preferably the patterned engagement is a thread to receive the first fastener and second fastener respectively.

Preferably the first stud and the second stud have reduced or no thread profile on their upper facing regions, at least when installed in the first member.

Preferably the first stud and the second stud have reduced or no thread profile on their upper and lower facing regions, in case the fastener are installed upside down.

Preferably the first base portion and or the second base portion have a boss portion that engages into the first aperture and or second aperture respectively to limit movement of the fastener within a major plane of the first member.

Preferably the first base portion and the second base portion each have a respective boss portion.

Preferably the first stud extends from a first boss portion, and the second stud extends from a second boss portion.

Preferably that part of the first stud and second stud, proximal their respective boss portions has no thread and is of increased diameter, compared to the threaded portion, the increased diameter to increase the strength of the studs where the second member will sit when engaged therewith.

Preferably the first base portion and or the second base portion include a peripheral skirt to lie outside a periphery of the first aperture and or second aperture, and against the back surface.

Preferably the engagement face is biased to engage the region of the third aperture by a tongue portion that curves away from, and then back to, the back surface.

Preferably the connecting portion is looped and has sufficient space to receive one or more fingers of a user therein to enable handling and attachment or removal of the fastener to the first member.

Alternatively a user can engage the tongue portion with their fingers to enable handling and attachment or removal of the fastener to the first member.

Preferably the engagement face has at least one extension to engage over the front surface of the first member.

Preferably the engagement face has at least one extension to engage behind the back surface or the front surface of the first member.

Preferably there are two engagement faces biased away from each other by the tongue portion to each engage an opposing region of the third aperture.

Preferably the fastener can be disengaged from the first member by disengaging the, or at least one of the, engagement faces from its respective region.

Preferably the fastener is made from a glass fibre reinforced plastic such as nylon or similar plastics material, for example that sold under the GRIVORY™ brand.

Preferably the fastener is able to be reused.

Preferably the fastener is dimensioned so as to fit the first aperture, second aperture or third aperture regardless of whether those apertures inner periphery is rectilinear or curved.

Preferably the second member sits between the first member and the first and second fasteners.

Preferably the first member is part of a rack system, and the second member is a piece of equipment to be secured in the rack system.

Preferably the clipping portion can be pinched by a user's fingers to engage and disengage the clipping portion from the third aperture.

Preferably the fastener is a unitary item.

Preferably the fastener is formed by injection moulding, additive manufacturing, or subtractive manufacturing.

Preferably the clipping portion and or connecting portion forms a rearward facing surface of the fastener for a user to push and engage at least the clipping portion with the first member.

Preferably the clipping portion has a contour on at least part of the rearward surface to indicate to a user an orientation of the rack fastener.

Preferably the contour serves to indicate to the user the orientation of the rack fastener and by feel how to insert and remove the rack fastener.

Preferably the first base portion and the second base portion also form part of the rearward facing surface.

Preferably there is at least one reinforcing rib to strengthen the connection between the first base portion, second base portion and the connecting portion.

Preferably the at least one reinforcing rib extends from a rear of the first base portion, second base portion and the connecting portion, away from the back surface.

Preferably the at least one reinforcing rib is on a periphery of the first base portion, second base portion and the connecting portion.

Preferably there are two reinforcing ribs.

Preferably the first base portion, second base portion and the connecting portion present a planar surface to the back surface.

Preferably the thread on the first stud and second stud only extends partway down, and there is a smooth surfaced portion between the thread and the boss portion.

Preferably the first stud and second stud have their centre lines offset from a centre line of their respective boss portions.

Preferably the tongue portion sits within an aperture between the first base portion, second base portion and the connecting portion, such that there is a free end containing the engagement face, the free end able to move within the aperture to allow engagement to, and disengagement from, the first member.

Preferably the other engagement face is on an extension of the tongue portion or clipping portion from the first base portion.

Preferably the engagement face or faces are located on extensions of the clipping portion.

Preferably the engagement faces include one or more reliefs to engage the third aperture.

Preferably the clipping portion has one or more returns on distal ends of the clipping portion, to over-engage the front surface of the third aperture.

Preferably there is a direction indicator on a forward presenting surface of the fastener to indicate to a user which is the preferred installation orientation.

Preferably the direction indicator is at least one arrow indicating the preferred upwards installation orientation.

Preferably one engagement face is narrower than the other engagement face.

In yet another aspect the present invention consists in a rack structure with at least one piece of equipment secured thereto, said equipment secured by a rack fastener, comprising or including, A first stud having a first base portion, adapted to install from a back surface of the rack structure into a first aperture thereof, such that the first stud extends through the first aperture, and extends from a front surface of the rack structure, A second stud having a second base portion, adapted to install from the back surface of the rack structure into a second aperture thereof, such that the second stud extends through the second aperture, and extends from the front surface of the rack structure, the second stud parallel to, and co-extensive with, the first stud, A connecting portion connecting the first base portion to the second base portion, A clipping portion extending, directly or indirectly, from the first base portion, the clipping portion having at least one engagement face to engage a region of a third aperture of the rack structure so that the fastener is substantially prevented from being separated from the rack structure, Such that the first stud and second stud can pass through respective apertures of the equipment, and thereafter a first fastener can engage the first stud, and a second fastener can engage the second stud to secure the equipment to the rack structure.

In another aspect the present invention consists in a fastener as described herein with reference to any one or more of the accompanying drawings.

In another aspect the present invention consists in a method of fastening as described herein with reference to any one or more of the accompanying drawings.

In another aspect the present invention consists in a rack structure with at least one piece of equipment secured thereto as described herein with reference to any one or more of the accompanying drawings.

In another aspect the present invention consists in a kit of parts as described herein with reference to any one or more of the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements and features, and where specific integers are mentioned herein which have known equivalents in the art to which this invention relates, such known equivalents are deemed to be incorporated herein as if individually set forth.

Other aspects of the invention may become apparent from the following description which is given by way of example only and with reference to the accompanying drawings.

BRIEF DESCRIPTION OF THE DRAWINGS

Preferred forms of the present invention will now be described with reference to the accompanying drawings in which.

DETAILED DESCRIPTION OF THE INVENTION

Preferred embodiments will now be described with reference to FIGS. 1 through 18.

Figure 1:
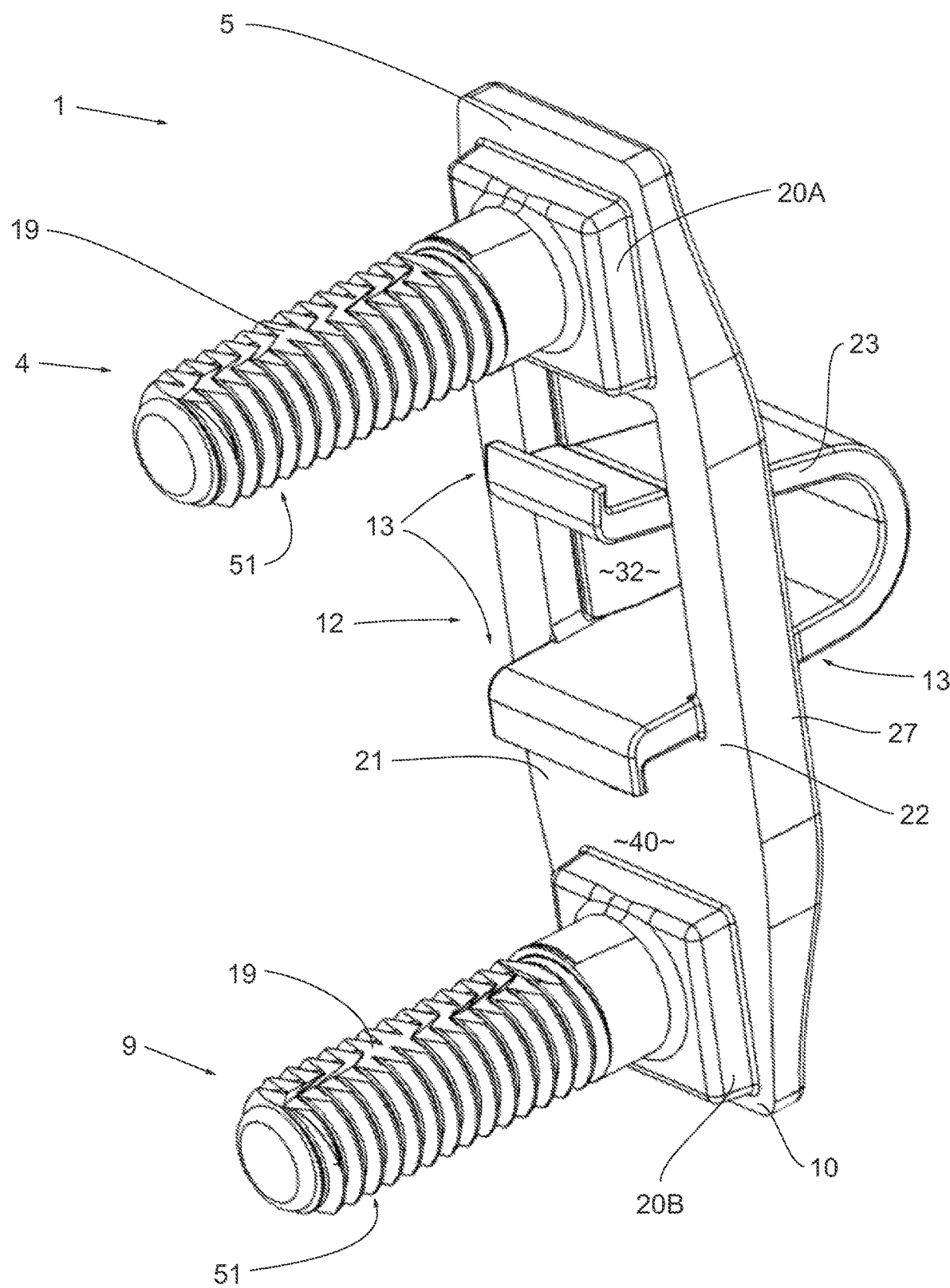
FIG. 1 Shows an isometric front view of a fastener in keeping with the present invention, FIG. 2 Shows a right hand side view of the fastener of FIG. 1, FIG. 3 Shows a front view of the fastener of FIG. 1, FIG. 4 Shows a left hand side view of the fastener of FIG. 1, with the two positions of the clipping portion in the relaxed state, and their state when engaged in the third aperture, FIG. 5 Shows a rear view of the fastener of FIG. 1, FIG. 6 Shows a rear isometric view of the fastener of FIG. 1, FIG. 7 Shows a top view of the fastener of FIG. 1, FIG. 8 Shows a typical rack that a fastener of the present invention can be used in with a piece of equipment, as the second member situated in place, FIG. 9 Shows a fastener of the present invention manoeuvring into place from behind the first member, FIG. 10 Shows a similar view to that of FIG. 9 with the fastener engaging into place in the first member (rack upright), FIG. 11 Shows a side view of the fastener, similar to that of FIG. 9, with the clipping portion displaced to prior to being engaged in the third aperture, FIG. 12 Shows a similar view to that of FIG. 9 with the fastener clipped into place in the first member (rack upright), FIG. 13 Shows a similar view to that of FIG. 12 from another angle showing the fastener clipped into place, FIG. 14 Shows a similar view to FIG. 13 with equipment (second member) in the process of being mounted to the fastener and rack upright (first member) and a threaded fastener being connected to the stud of the fastener, FIG. 15 Shows a cross section of through the equipment (second member), fastener, and rack (first member), FIG. 16 Shows a minor variation to that shown in FIG. 6 with an extended clipping portion and contouring for a user, FIG. 17 Shows a front top isometric view of a further variation of the fastener, and FIG. 18 Shows a front top isometric view of another variation of the fastener.
Figure 2:
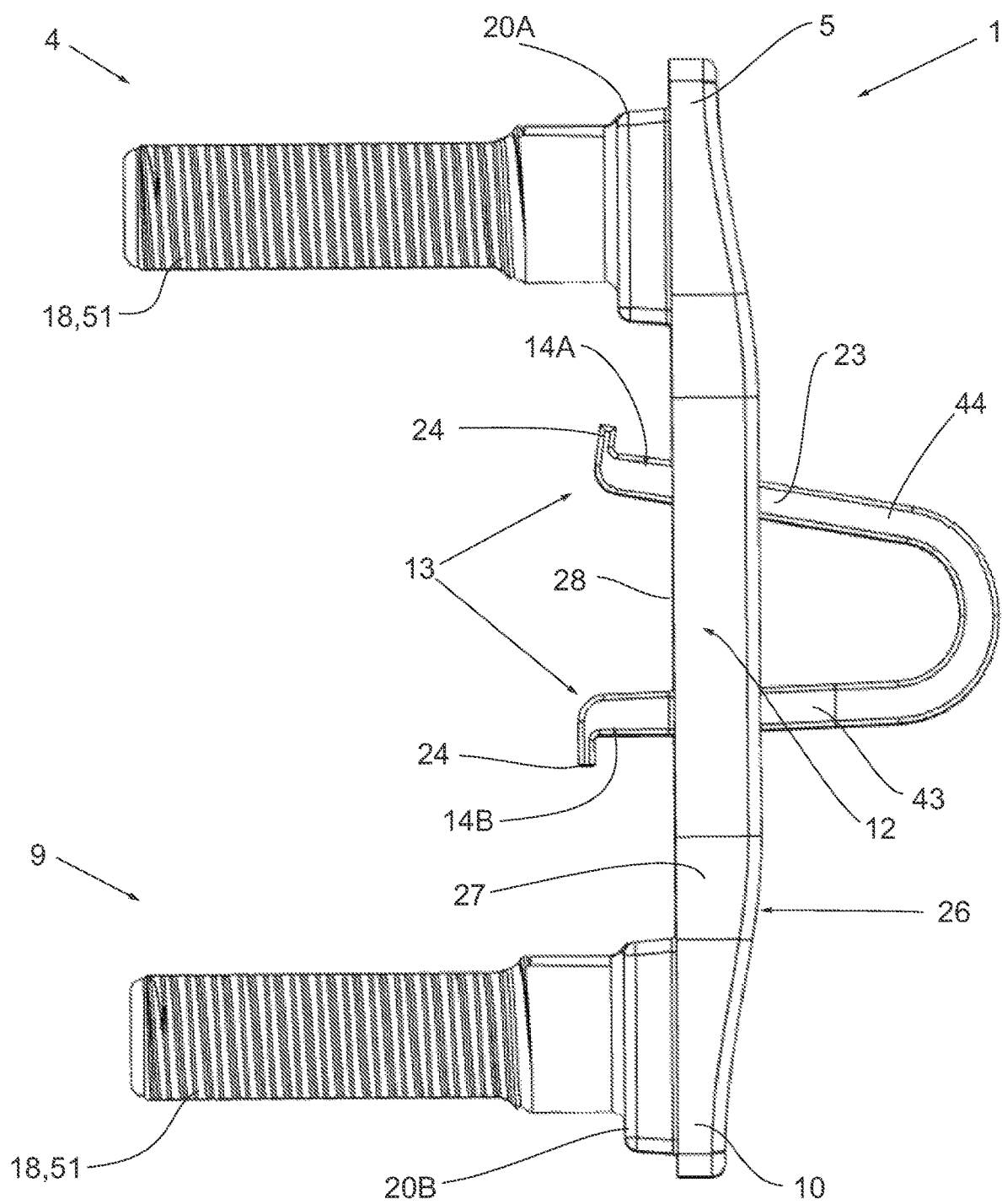

The rack fastener 1 as shown in FIG. 1 has a first stud 4 extending from a first base portion 5, and a second stud 9 extending from a second base portion 10. The base portions 5 and 10, and thus their respective studs 4 and 9 are connected therebetween by a connecting portion 12. The studs 4 and 9 extend parallel to each other in the same direction and are of the same length that is they are co-extensive.

The first stud 4 and second stud 9 are contoured with a patterned engagement 18 to engage and retain a first fastener 38 and second fastener 39 respectively. In the preferred form the engagement is a threaded one, and the first fastener 38 and second fastener 39 are nuts that can engage the thread on the first stud 4 and second stud 9. In other forms the engagement may be a bayonet or other form. The first stud 4 and second stud 9 have reduced or no thread profile 51 on their upper facing regions 19, at least when installed in the first member. This prevents, or reduces damage to the thread profile 51 when heavy equipment is slid over the studs.

Preferably the first stud and the second stud have reduced or no thread profile on their upper and lower facing regions, in case the fastener is installed upside down.

Figure 3:
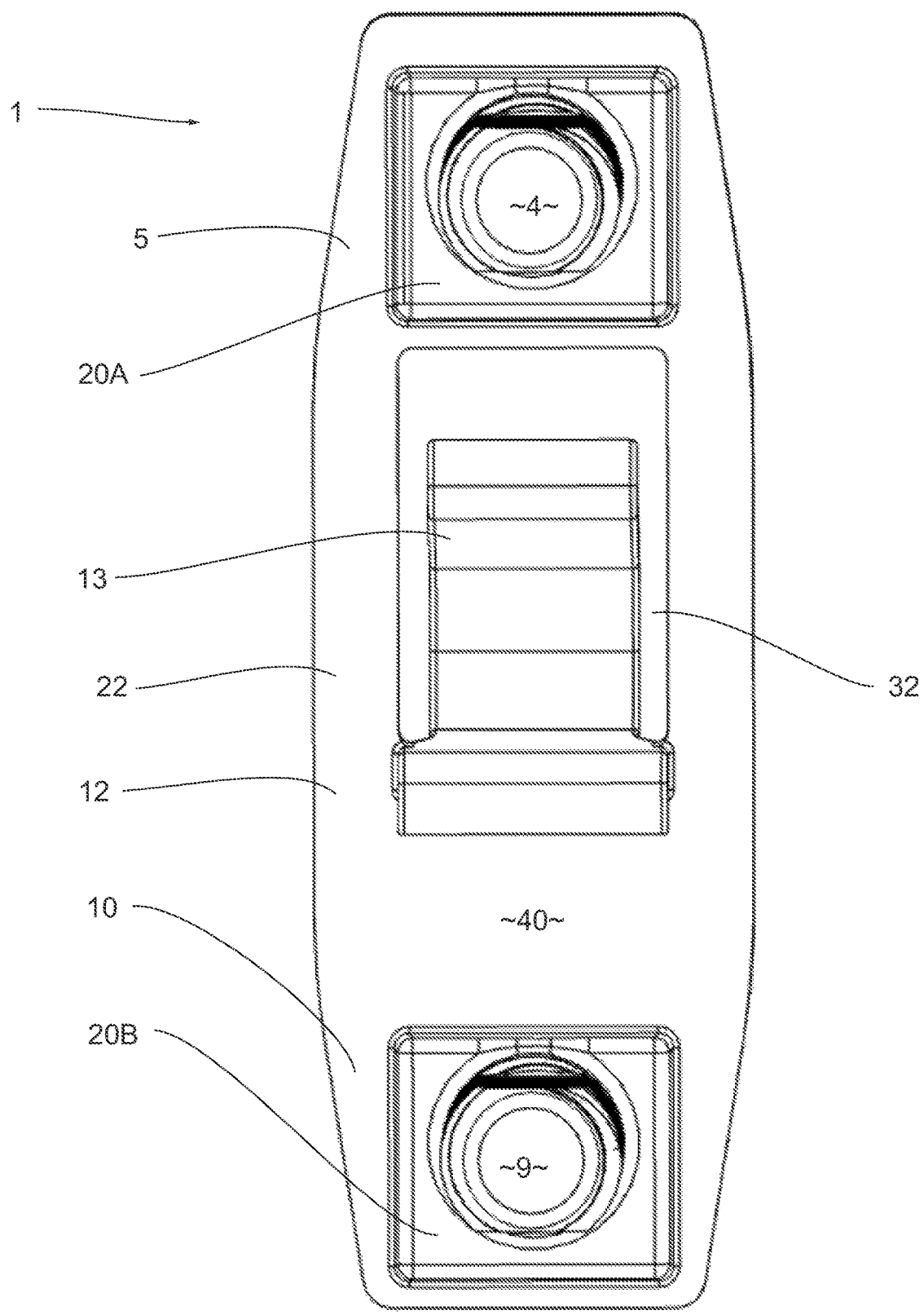
Figure 8:
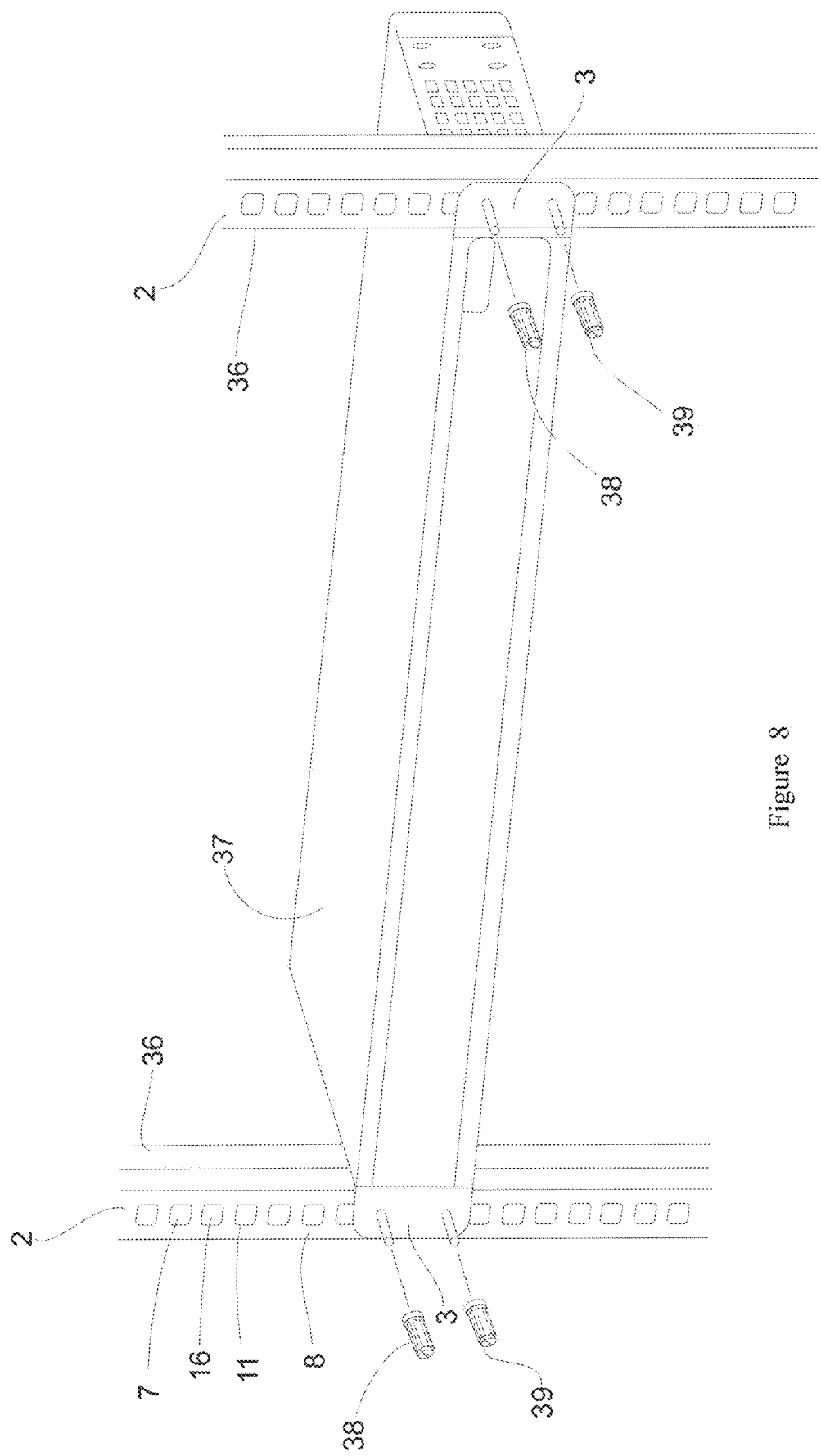

In the preferred embodiment as shown the base portions 5 and 10 include boss portions 20A and 20B respectively. The reason for these will become apparent when they are shown engaged in the apertures of the first member 2, typically an upright or similar of a rack 37 which holds electrical, electronic, audio, security or information technology hardware, for example as shown in FIG. 8. The shape of the boss portions 20A and 20B as shown, for example in FIG. 3, is rectangular. However, they could be any convenient shape needed to fit into the first and second apertures 7 and 11 (described later) of the first member 2.

As the boss portions 20A and 20B extend into the apertures 7 and 11 they reduce the overall length of their respective studs 4 and 9 and thus reduce the leverage and shear force they experience, especially when the second member 3 is located on the stud, prior to the first fastener 38 or nut, and second fastener 39 or nut tightened thereon (described later). The boss portions 20A and 20B, as they are shaped to be complimentary to the apertures 7 and 11, reduce the amount of movement laterally of the apertures of the fastener when engaged in the first member 2. This can have the effect of reducing dynamic loading on the rack fastener 1.

Figure 4:
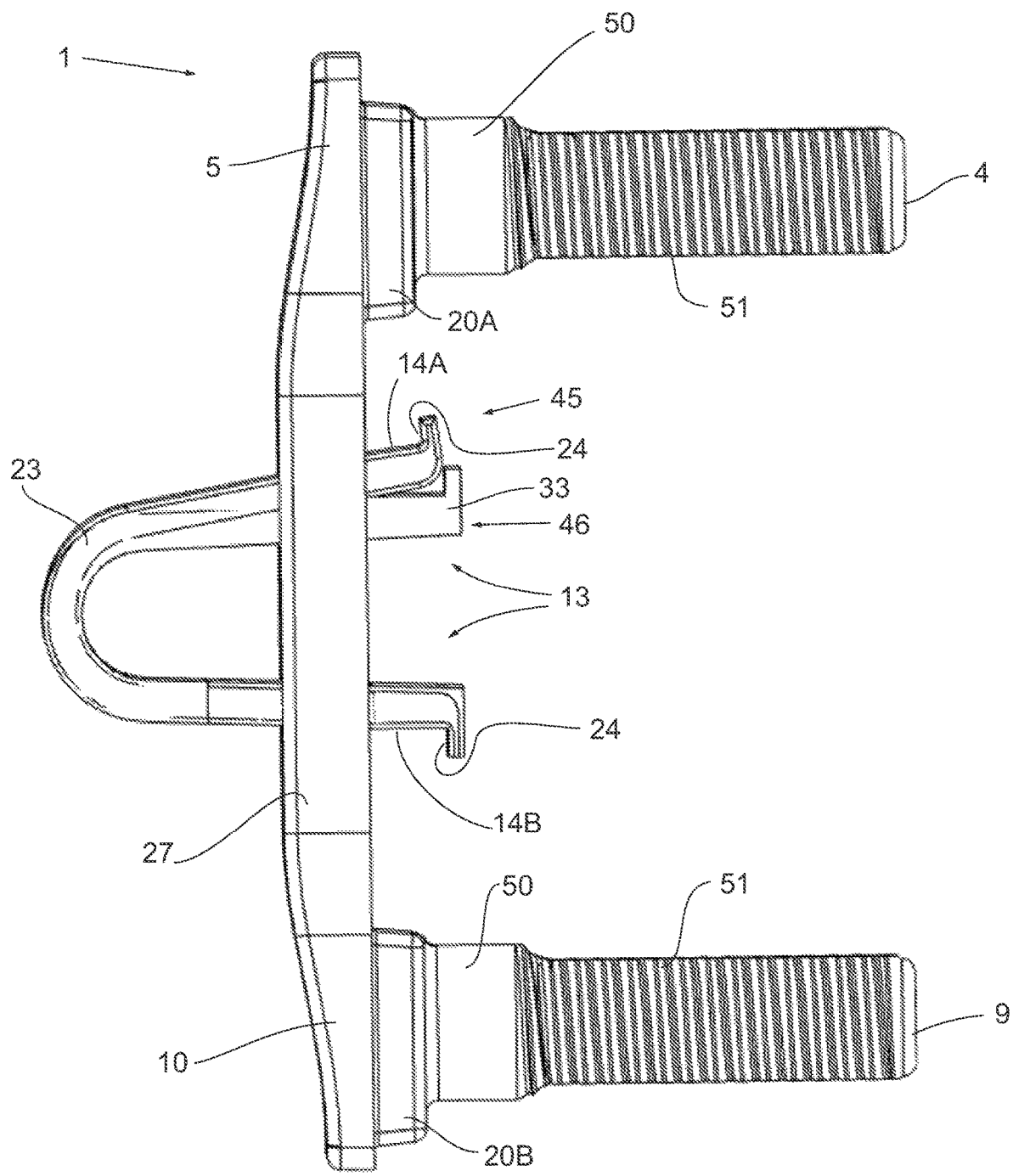

Best seen in FIG. 4 that part 50 of the first stud 4 and second stud 9, proximal their respective boss portions 20A and 20B has no thread and is of increased diameter, as a smooth surfaced portion, compared to the threaded portion 51. The increased diameter increases the strength of the studs 4 and 9, where the second member will sit when engaged therewith. This is especially so before the fasteners 38 and 39 are engaged as the equipment then will possibly be hanging loose, and so all load may be in shear on only one or two studs, normally the upper most stud.

Figure 15:
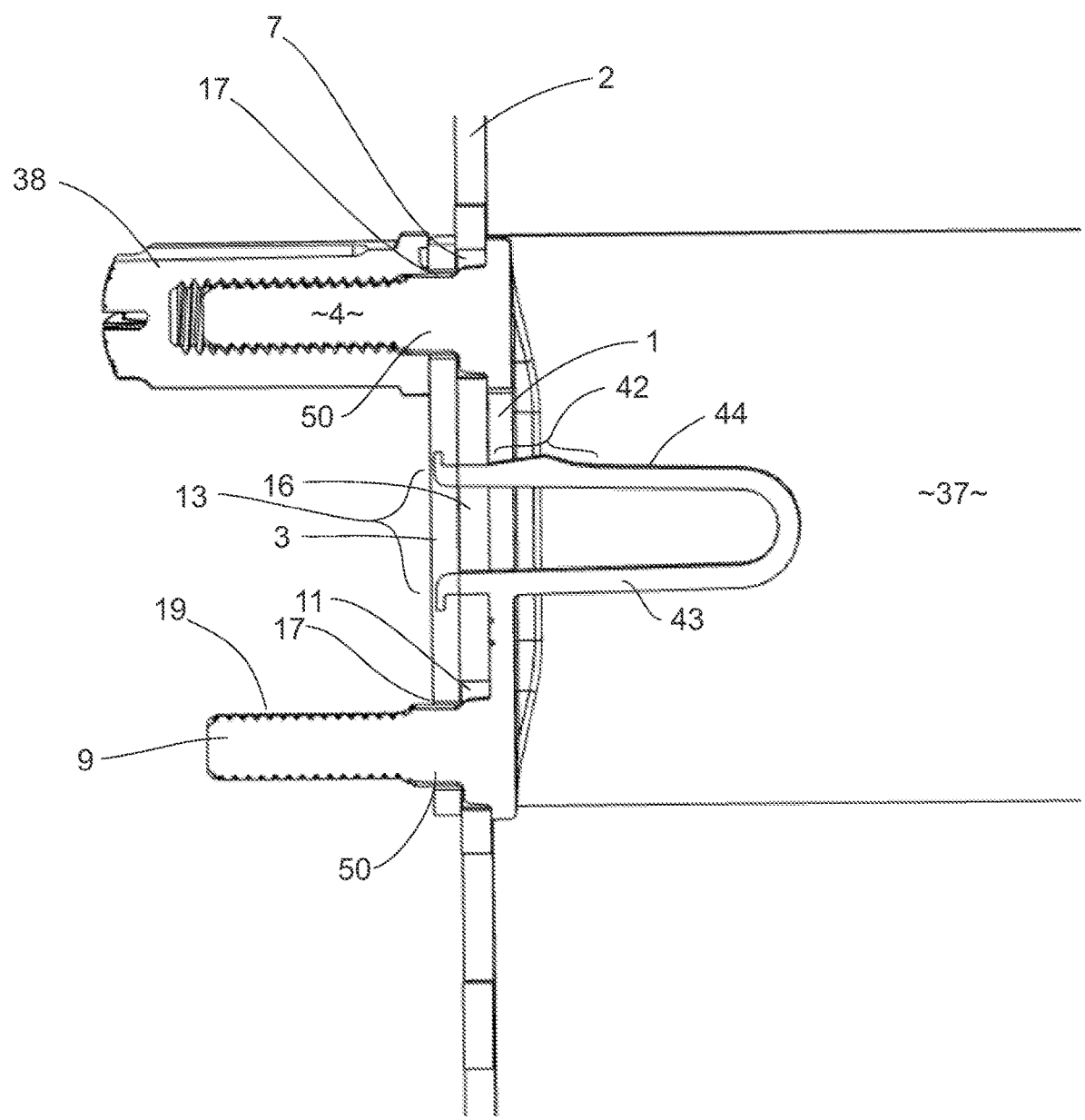
Figure 16:
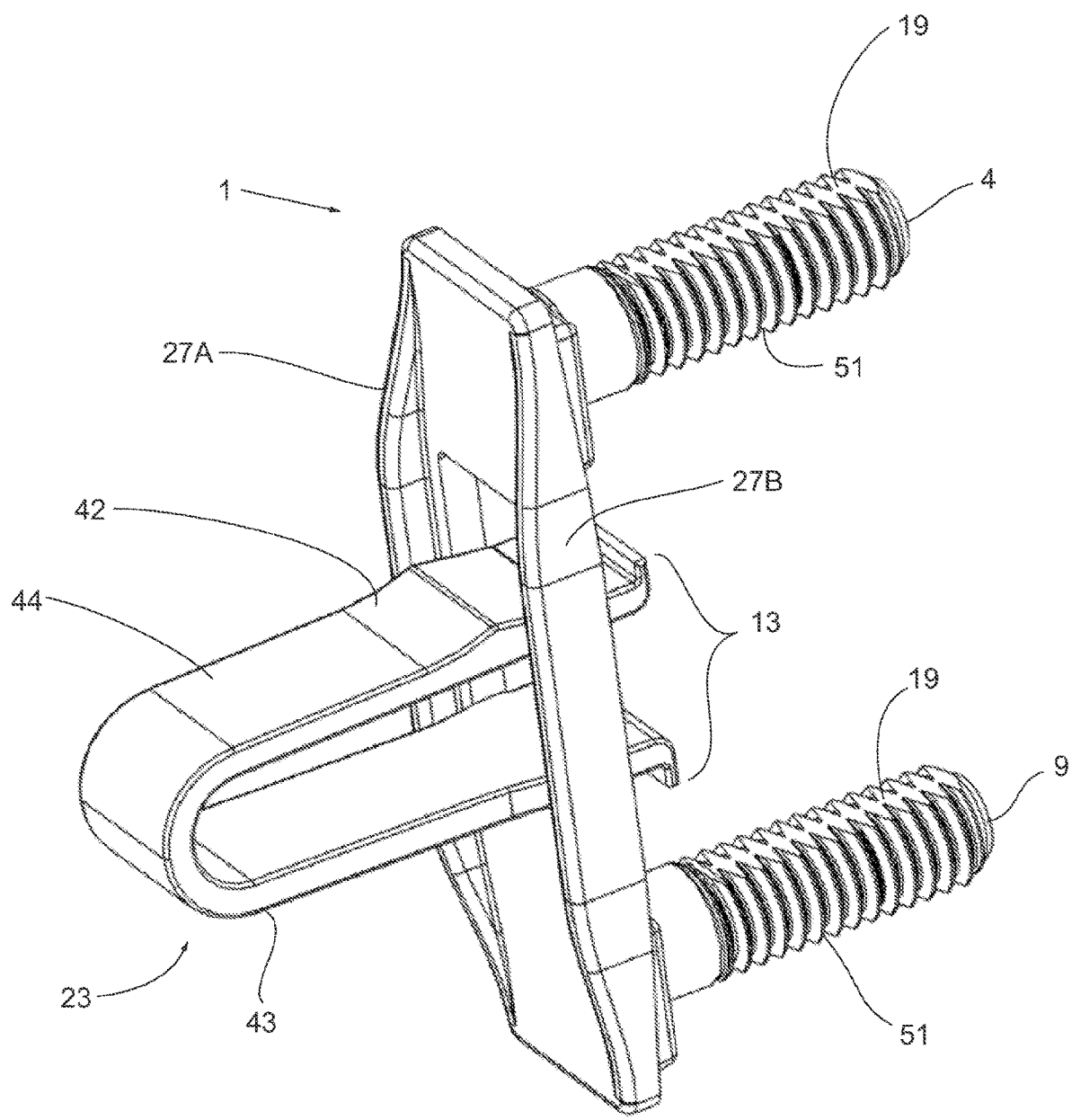
Figure 17:
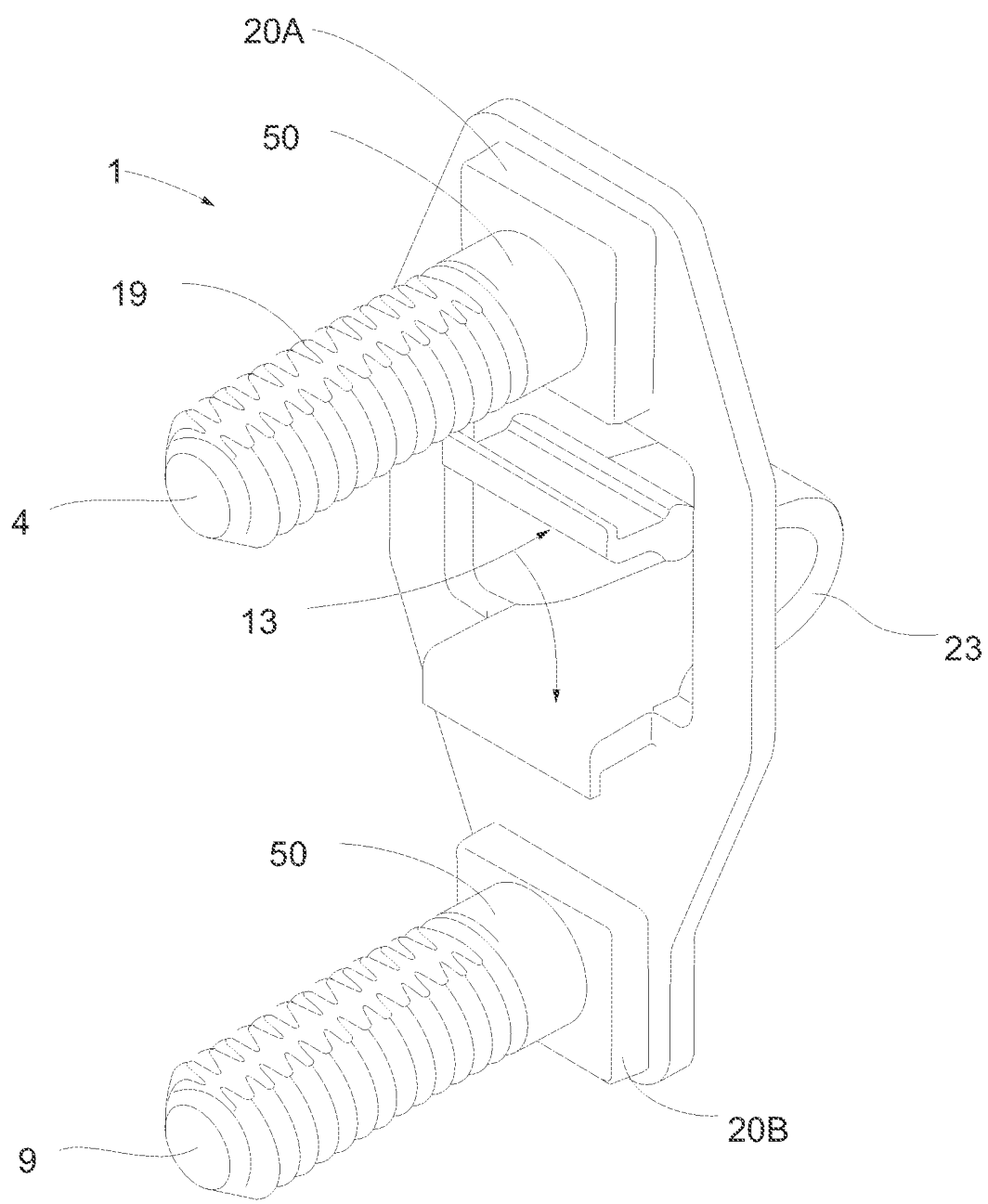

The connecting portion 12, or a part thereof, has a forward facing surface 40. This, in the preferred form is created by peripheral skirt 22 outside the base portions. A function of the forward facing portion 40 is to provide a backstop to the studs 4 and 9 against the back surface 41 to prevent them being pulled through. The forward facing surface 40 in the preferred form is complimentary to the back surface 41 of the first member 2, at least to allow the studs to extend through the apertures. In the preferred form the back surface 41 is planar, and therefore so is the forward facing surface 40 as a planar surface as shown in FIGS. 15 and 1. However, the back surface 41 may have other contouring or shape, and the forward facing surface 40 is contoured to fit.

The rack fastener 1 has a clipping portion 13 as seen in FIGS. 1 to 7. The clipping portion 13 has the function of engaging the third aperture 16 in the first member 2. In the preferred form the clipping portion 13 lies between the first stud 4 and the second stud 9. Therefore the third aperture 16 will also lie between the first aperture 7 and the second aperture 11. The clipping portion 13 as shown in the preferred form in FIG. 1 has a tongue portion 23 that can move against a bias. In the preferred form as shown the tongue portion 23 resides in an aperture 32 formed between the first stud 4 and second stud 9. The tongue portion 23 has a U shape that curves away from, and then back to, the back surface and extend therethrough as below. The tongue portion 23 has a first leg 43 of the U connected to the second base portion 10, or first base portion 5, or the second base portion 10. The free end 33, or second leg 44, is able to flex relative to the first leg 43 due to the inherent resilient properties of the material of the rack fastener.

The clipping portion 13 can flex from its natural first position 45 shown in FIG. 4 to or toward a second position 46. Due to the natural inherent properties of the rack fastener 1 the first leg 43 and second leg 44 are biased toward the first position 45. In use a user will grasp an external surface 47 and collapse the clipping portion 13 from the first position 45 against the natural bias, toward the second position 46. This will cause the first leg 43 and second leg 44 to move toward each other. This is done until the external dimensions between the ends of the two legs 43 and 44 are such that it can move through, into and past the third aperture 16. Once through the third aperture 16 the user can release the clipping portion 13 to then be retained by a region 15 of the third aperture 16, against its bias. This region, in the preferred form is the internal periphery 48 of the third aperture 16.

In the preferred form the clipping portion 13 has at least one contour 42 on the external surface 47 as shown in FIG. 15. In the preferred form there is one contour 42 only and it is on the external surface 47 of the second leg 44. The contour 42, provides tactile feedback to the user or their fingers 52 to indicate which portion of the clipping portion will flex—this allows them to more easily insert the clipping portion into the third aperture. The clipping portion 13 can have no contour also, however we have found that this makes them a little harder, or less intuitive, to install and remove. The contour 42 also can aid in removal of the rack fastener 1 from the first member 2, as when the clipping portion 13 is compressed, it provides a grip for the user to then extract the rack fastener 1.

There is the possibility of using a tool to pinch the clipping portion 13 for insertion and removal.

The clipping portion 13 has returns 49 on the distal ends of the first leg 43 and second leg 44 as shown in FIG. 1. It is these returns 49, in the preferred form, that must pass through the third aperture 16 to lie on or past a front surface 8 of the first member 2. In this way, coupled with the bias of the clipping portion 13 the clipping portion cannot, under normal operation, be removed, until the clipping portion is compressed again to allow the returns 49 to pass back through the third aperture 16.

The clipping portion 13 may also be further contoured where it engages the third aperture 16 with engagement faces 14 to enhance its retention therein. These engagement faces 14A as shown in FIG. 1 may be as reliefs as shown, or otherwise, in the external surface of one or both the first 43 and second leg 44, where they engage the region 15 of the third aperture 16. In the preferred form the engagement faces 14A and 14B engage opposing regions 25A and 25B of the internal region 15 of the third aperture 16. In addition, preferably there are extensions 24 to over-engage the front surface 8 of the first member 2 to prevent withdrawal of the rack fastener 1.

The rack fastener 1 has a rearward facing surface 26 formed on the rear facing surfaces of the first base portion and second base portion, and at least in part the clipping portion for a user to push and engage at least the clipping portion 13 with the first member, and to push the rack fastener 1 into place.

In the preferred form the rack fastener 1 is made from a moulded material, such as used in injection moulding, casting or similar. In the preferred form the fastener is made from a glass fibre reinforced plastic such as nylon or similar plastics material, for example that sold under the GRIVORY™ brand. In other forms it may be formed by additive manufacturing, such as, but not limited to three dimensional printing. In doing so the rack fastener 1 is preferably a unitary item.

The connecting portion 13 may have a reinforcing rib 27 or ribs 27A and 27B extending between it and the first base portion 5 and the second base portion 10, as seen in 16 to strengthen the connection therebetween. As seen the reinforcing rib 27 extends from a rear of the first base portion 5, second base portion 10 and the connecting portion 13, away from the back surface, and as shown there are two ribs 27, on each on either side. The reinforcing rib(s), as the name suggest, reinforce the connection between the connecting portion 13 and the first base portion 5 and the second base portion 10. In the embodiment shown at least in FIG. 1 the reinforcing ribs 27 extend all the way between the first base portion 5 and the second base portion 10. The reinforcing ribs 27 also provide tactile feedback to the user to indicate the orientation of the rack fastener 1 when it is being installed and removed.

Figure 18:
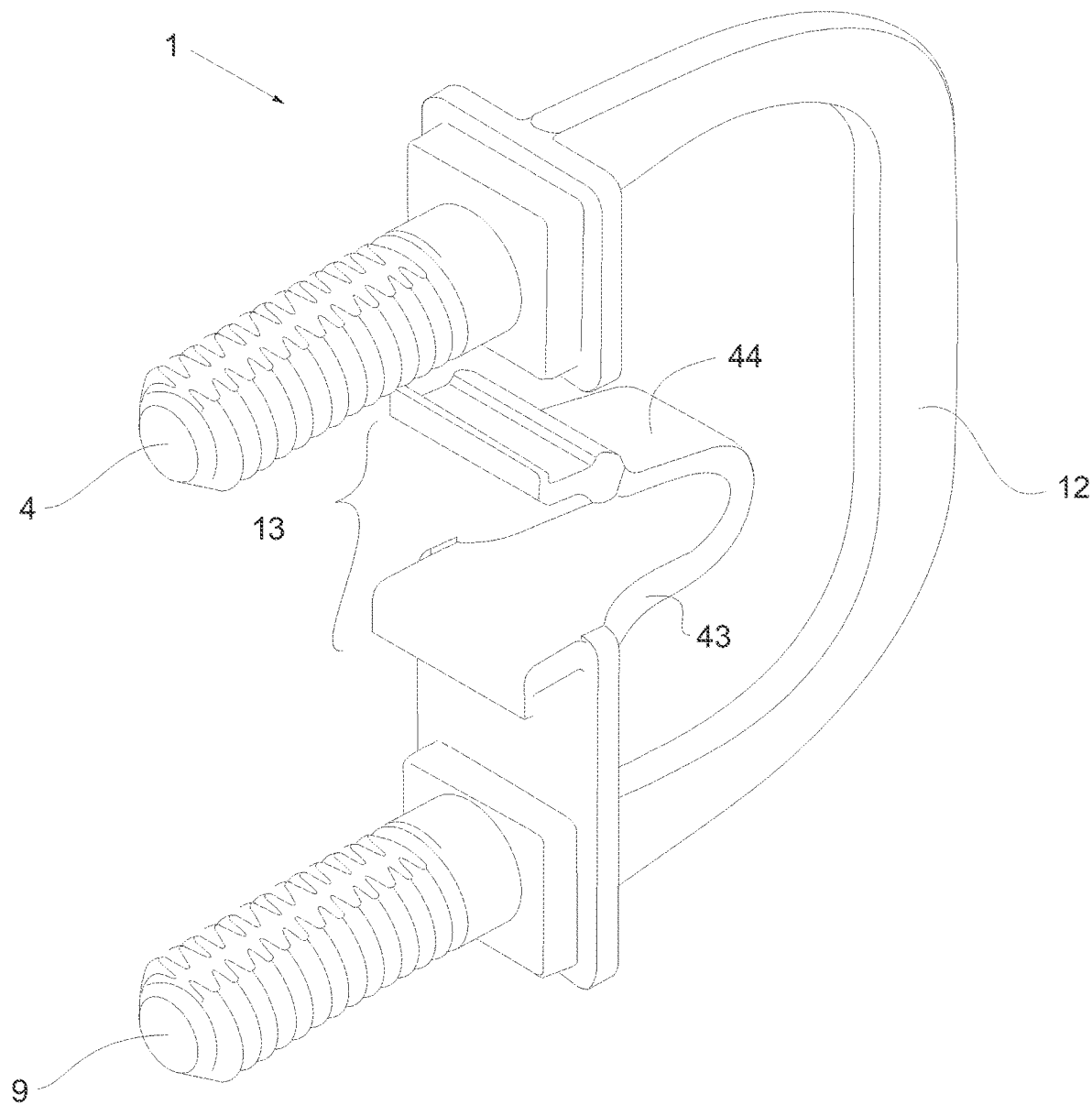

The connecting portion 12 may take several forms, such as that shown in FIGS. 1 to 7, and 17, where it is unitary with, and connecting between, the base portions 5 and 10 and also holds, within its form, the clipping portion 13. However in other forms, such as shown in FIG. 18 the connecting portion 12 may connect between the base portions 5 and 10, and the clipping portion 13 extends from one of the base portions 5 but not from the connecting portion 12.

As shown in FIG. 3 the main axis of the first stud 4 and second stud 9 is shown offset from the centre of their respective bosses 20A and 20B. The reason for this is to allow for easier insertion by allowing the bottom fixed 'hook' to be manoeuvred up and over the fixed rail assembly.

Figure 5:
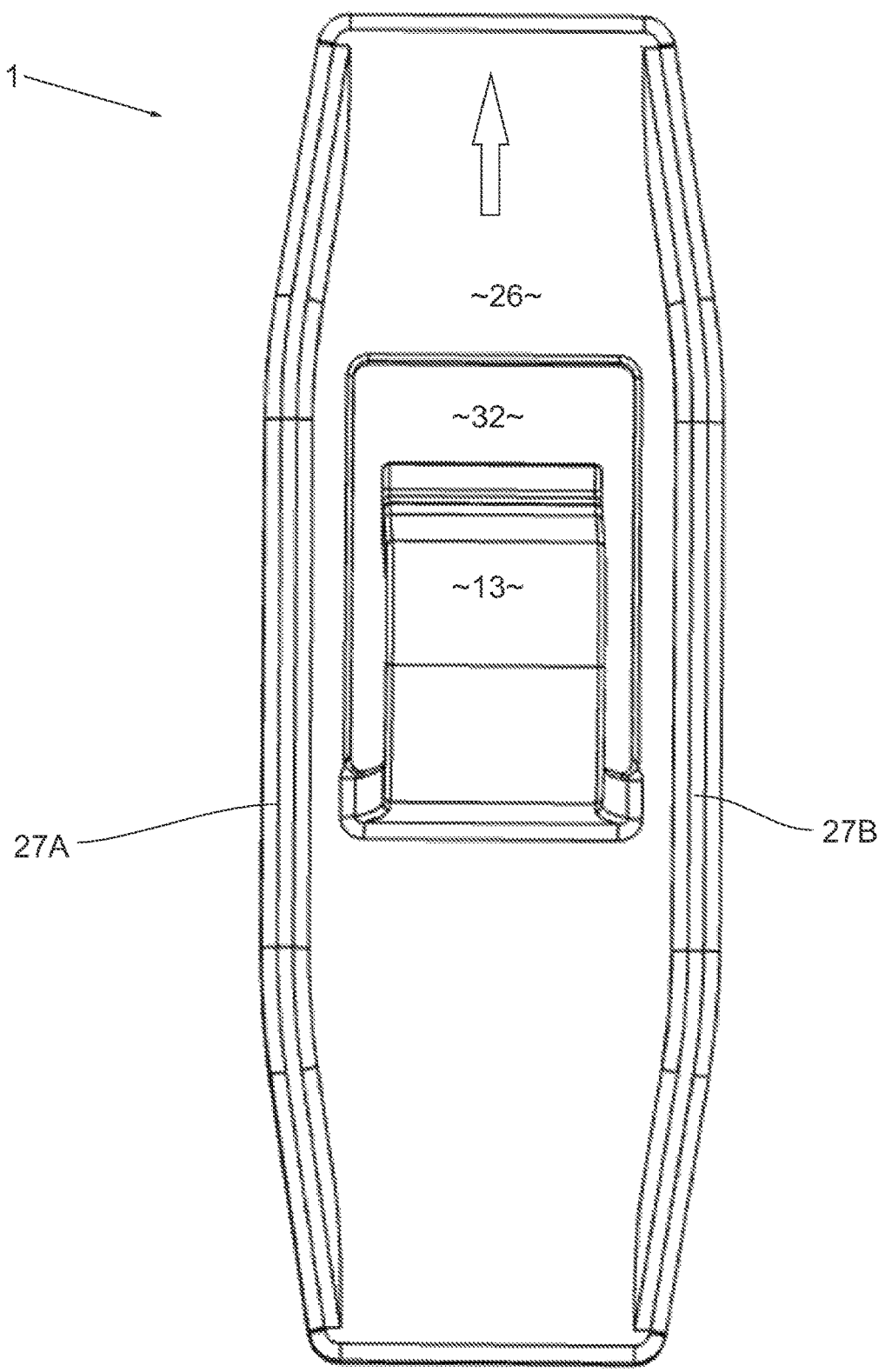
Figure 6:
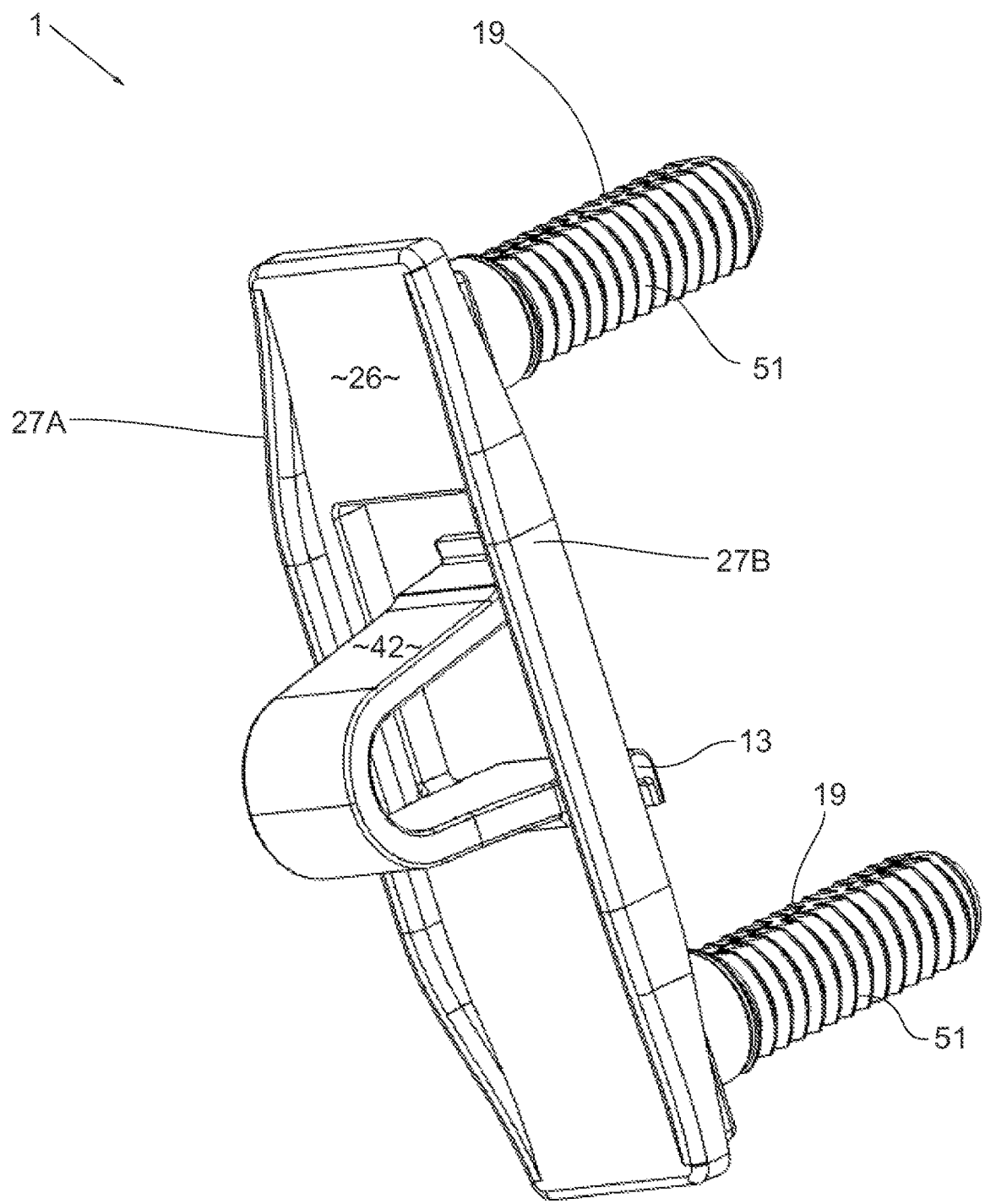
Figure 7:
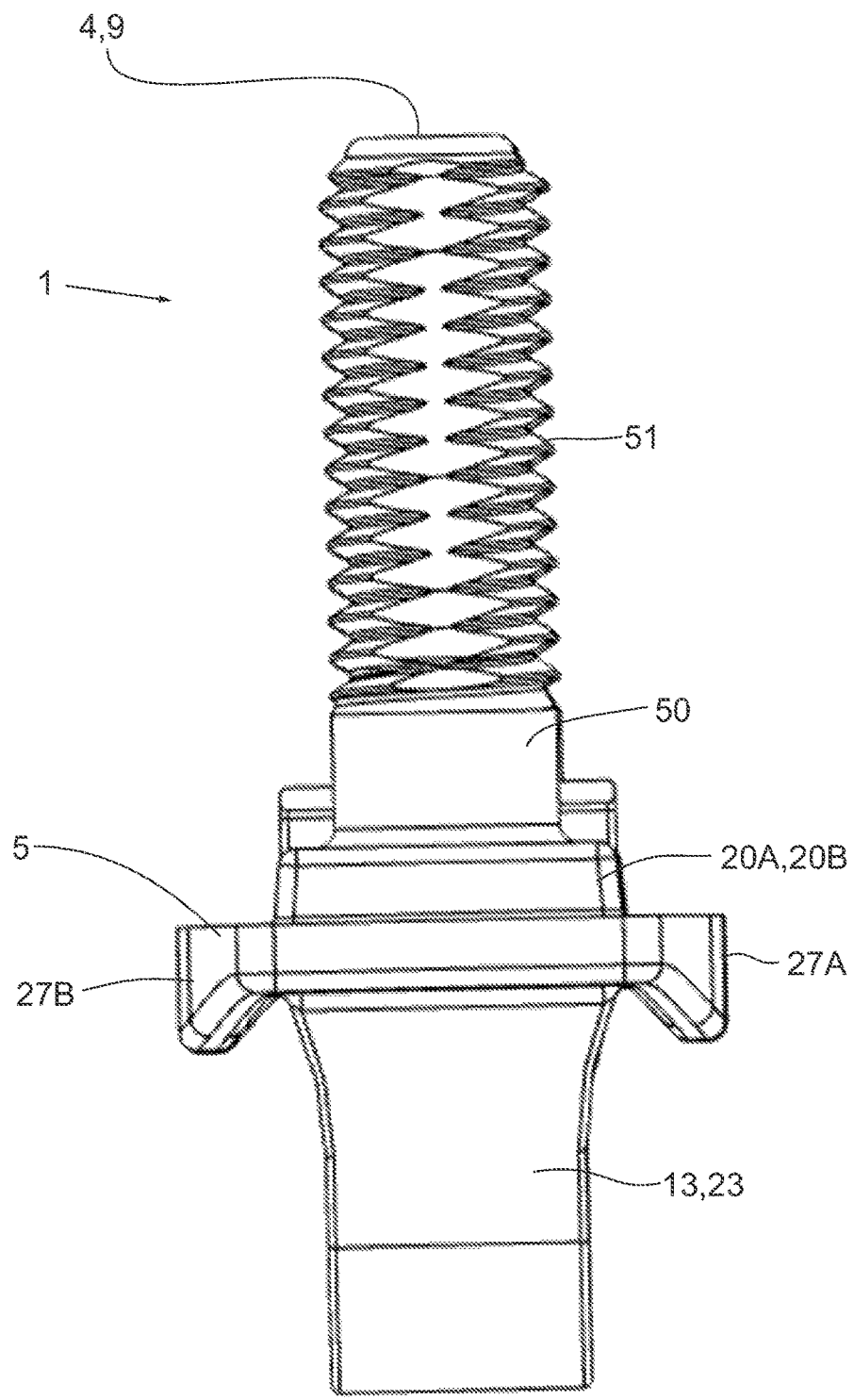

The rack fastener 1 also optionally has a direction indicator 35, such as an arrow as shown in FIG. 5 to indicate the correct way up for the rack fastener. While an arrow is described it could be some other form of indicator also that is visual as well as tactile.

Figure 9:
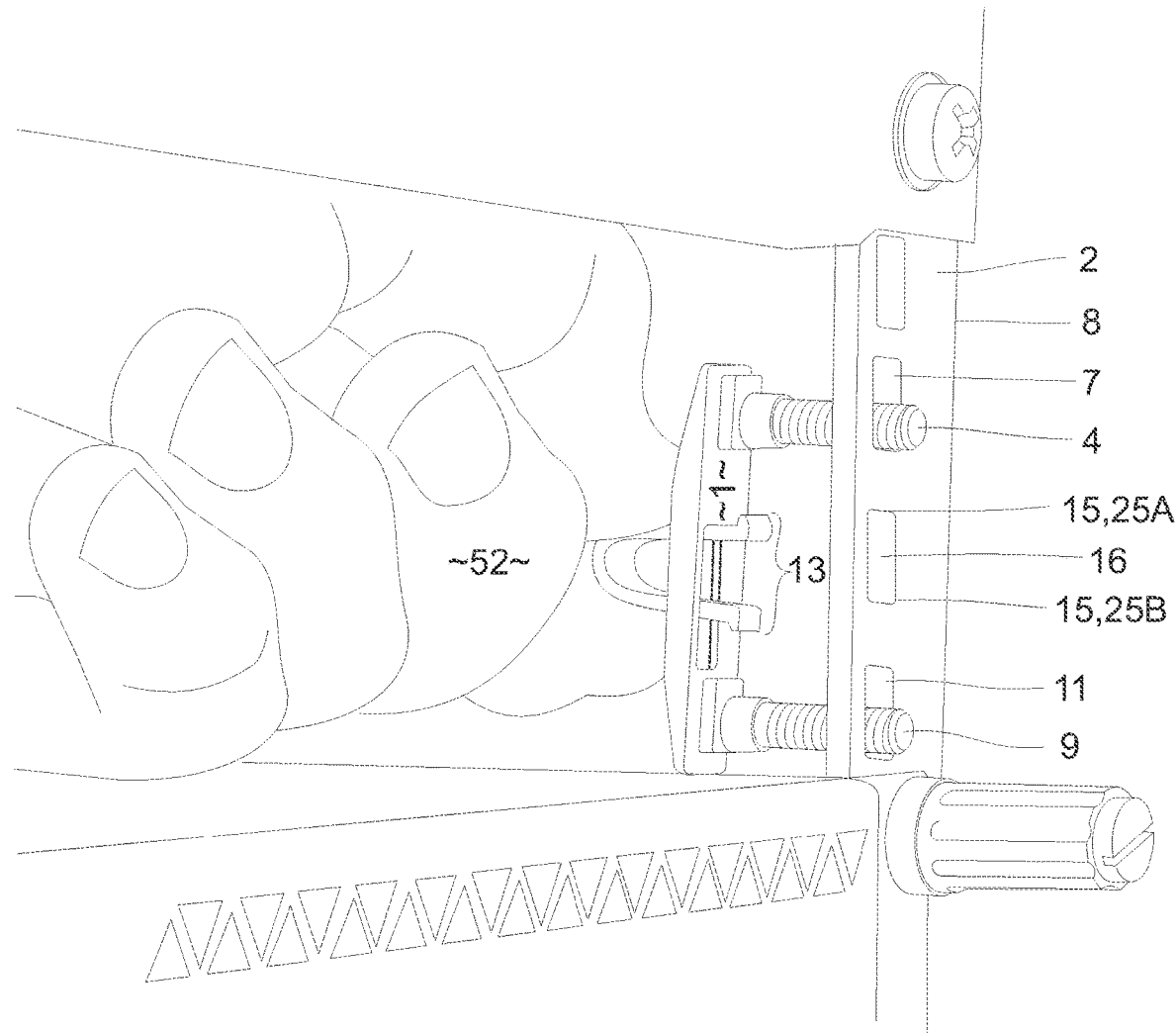

As shown in FIGS. 1 and 3 the boss portion 20A and 20B is rectangular in shape. Likewise the first aperture 7 in the first member 2, the rack upright, is rectangular as seen in FIG. 9. The boss portion 20 is sized to just fit into the first aperture 7. In some rack mount systems the first aperture 7 may be of a different sized rectangle or it may be square or circular or otherwise. In this situation the boss 20 is complimentary to that shape and sized to fit that differing sized and shaped aperture 7. The fit is snug to prevent as much lateral movement of the rack fastener 1 relative to the first member 2.

Shown in FIGS. 9 through 14 is a method in keeping with the present invention for installing the rack fastener 1 to secure a second member 3, for example a piece of equipment, to the first member 2, for example a rack upright.

Figure 10:
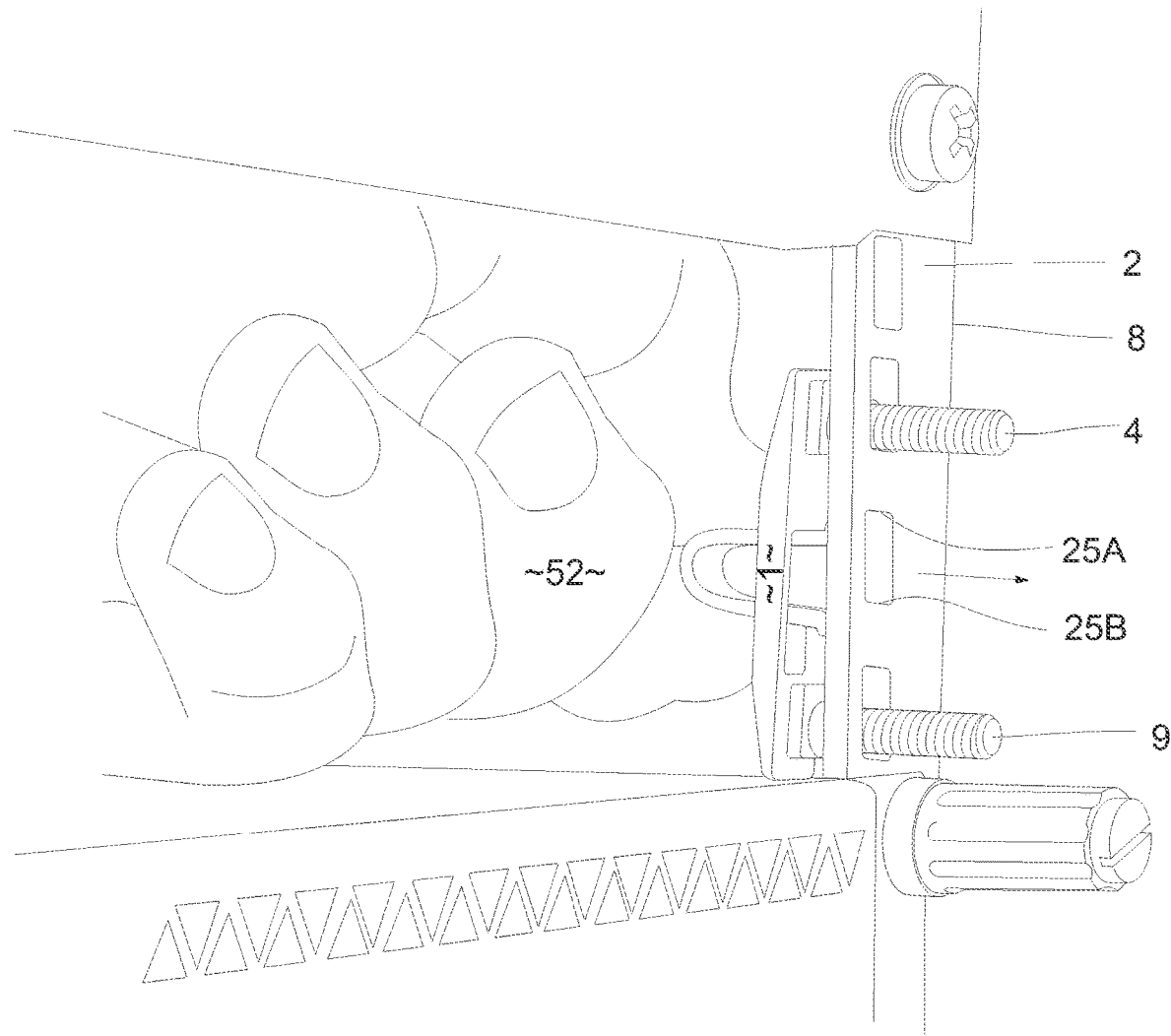

The rack fastener 1 is passed from behind the back surface 6 of the first member 2, as shown in FIG. 9. The studs 4 and 9 are aligned with the desired first and second apertures 7 and 11 passed through them, the first stud 4 into the first aperture 7 and the second stud 9 into the second aperture 11, as shown in FIGS. 9 and 10.

Figure 11:
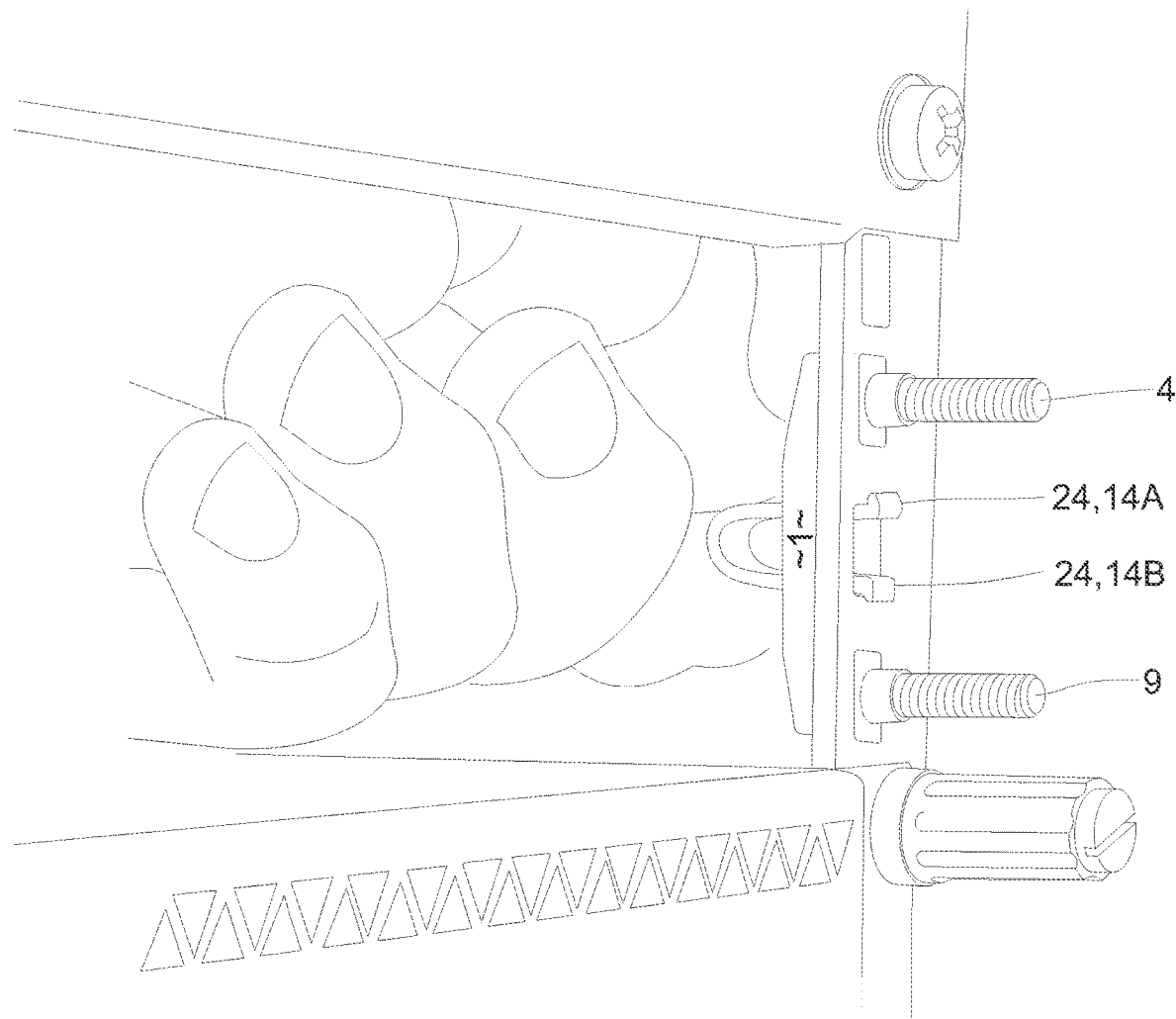

The rack fastener is moved in this direction from the back surface 6 to the front surface 8 so the studs 4 and 9 then extend past the front surface 8 and the clipping portion 13 comes to abut or engage the third aperture 16 as shown in FIG. 11. The user, if they have not already, squeezes the clipping portion to narrow the presenting dimension of the clipping portion so it can pass into the third aperture 16. In other forms the clipping portion 13 may have tapered surfaces that hit the back surface 6 near the third aperture 16, and engage the interior periphery, or at least 1 or two sides of that periphery, of the third aperture to naturally compress the clipping portion to allow it to pass into and through the third aperture 16.

Figure 12:
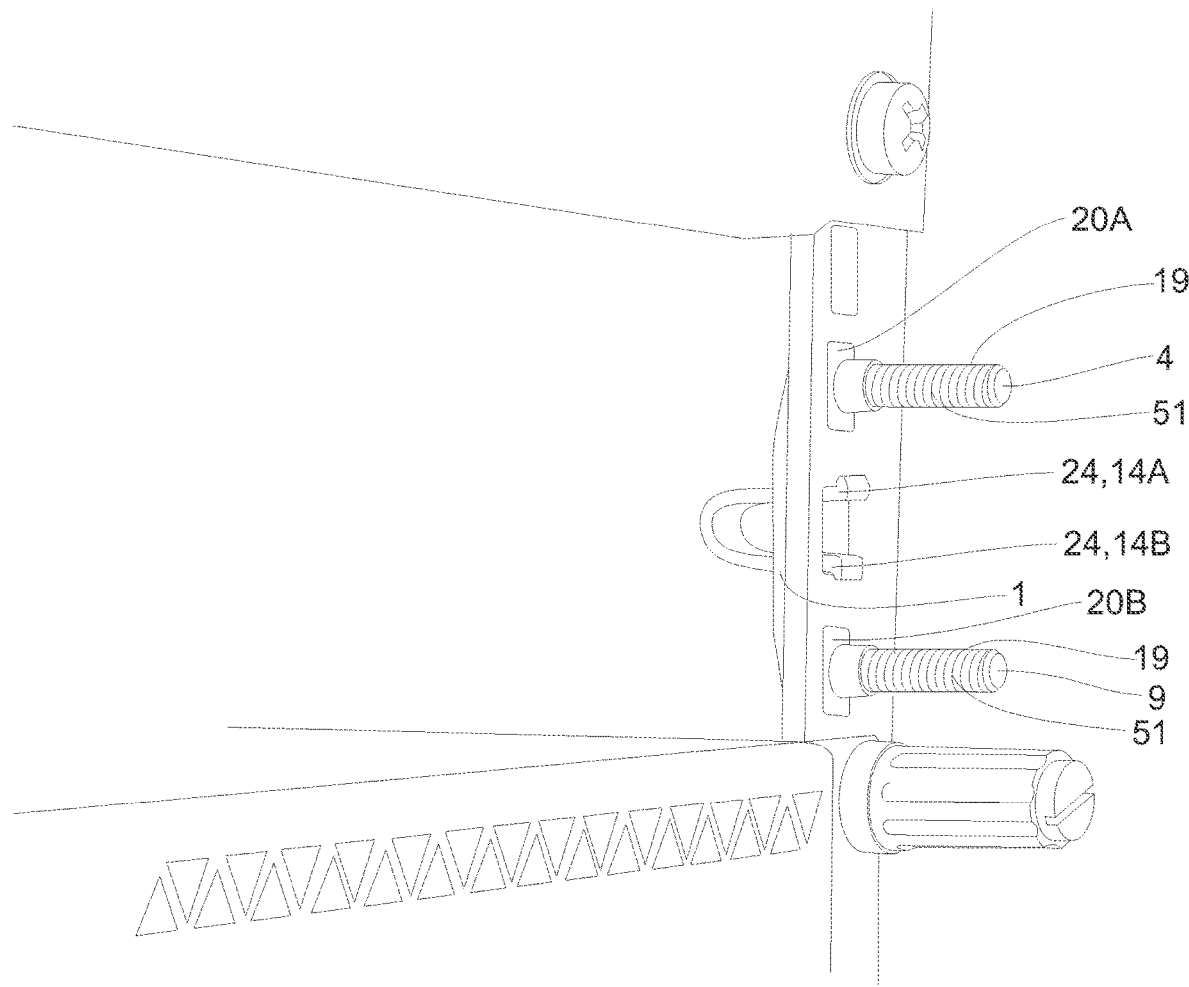
Figure 13:
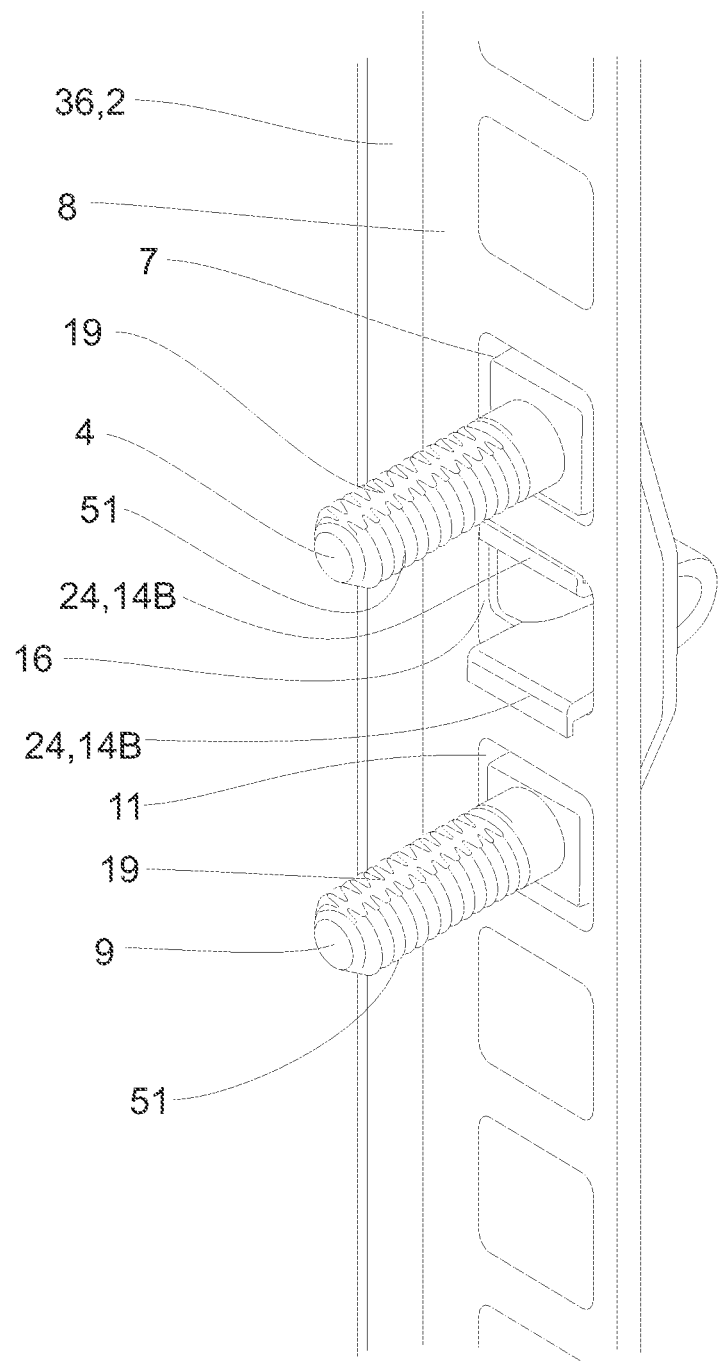

In the preferred form the rack fastener 1 is pushed all the way until the bosses 20A and 20B are engaged in their respective apertures 7 and 11, and the clipping portion, as described above, is engaged in the third aperture 16, as shown in FIGS. 12 and 13. If needed this is repeated on the other rack upright.

Figure 14:
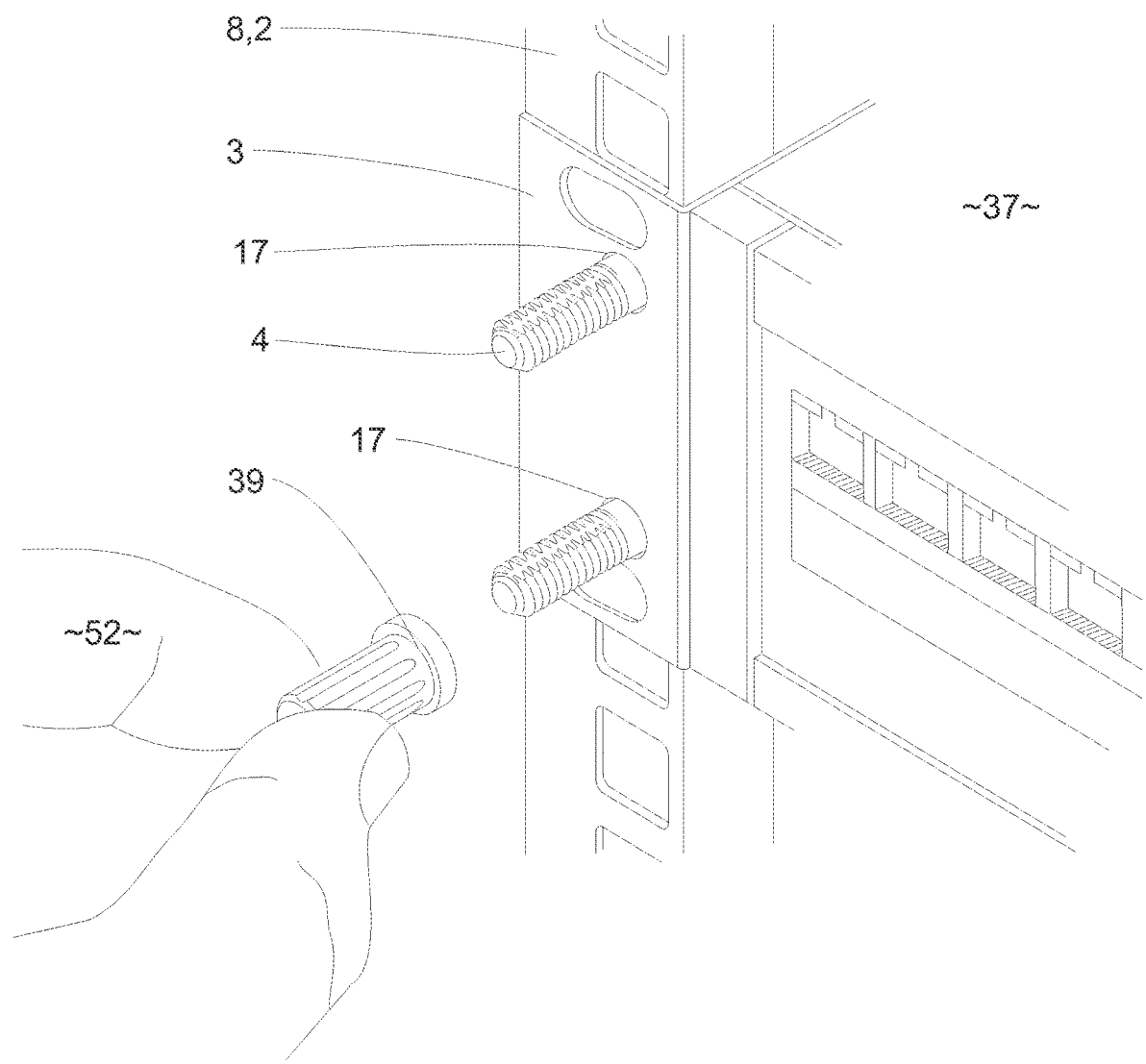

The equipment can now be moved into place and the second member 3 passed over the studs 4 and 9 so they pass into respective apertures 17 of the second member as shown in FIG. 14.

A first fastener 38 and second fastener 39 are then located over their respective studs 4 and 9 to fasten and hold the second member 3 to the first member 2. In this way the second member, which may be a bracket or similar of a piece of equipment 37, and hence the equipment 37 also, maybe held in place, for example in a rack 36 for electrical, information technology, audio or security or other equipment.

The resulting assembly is shown in cross section in FIG. 15, where the second member 3, as part of a rack mounted piece of equipment 37 is held to the first member 2, a rack 36 upright, the fastener 1 passing through from the back surface 6 through and past the front surface 8, and a fastener 38 engaging the stud 4 to hold the assembly together. The clipping portion at this point does not serve any structural function.

In this way the rack fastener 1 can be mounted to the rack 36 and left in place as necessary, retained by the clipping portion 13, until a piece of equipment 37 needs to be connected there to. The fastener is then used to mount equipment 37 to a rack 36. The equipment 37 can then also be removed by removing the necessary fasteners 38 and or 39, and the rack fastener 1 will remain engage to the rack 36 by the clipping portion 13. Then if necessary the rack fastener 1 can then also be removed from the rack 36 and reused as necessary.

In the preferred form the fasteners 38 and 39 are threaded as are the studs. However, in other forms they may use differing engagements provided these are suitable to retain the equipment to the rack.

Removal of the equipment 37 requires removal of the fasteners 38 and 39, on both sides if necessary, to allow the equipment to be parted from the rack upright. If needed the rack fastener 1 can also be removed from the first member/rack upright 2, by squeezing the clipping portion such that it disengages the third aperture 16, and then it can be removed in the reverse way to it being installed.

The foregoing description of the invention includes preferred forms thereof. Modifications may be made thereto without departing from the scope of the invention.

What is claimed is:

1. A rack fastener adapted to engage, and be retained to, a first member and then hold a second member to the first member, comprising or including,
   a. a first stud having a first base portion, adapted to install from a back surface of the first member into a first aperture thereof, such that the first stud extends through the first aperture, and extends from a front surface of the first member,
   b. a second stud having a second base portion, adapted to install from the back surface of the first member into a second aperture thereof, such that the second stud extends through the second aperture, and extends from the front surface of the first member, the second stud parallel to, and co-extensive with, the first stud,
   c. a connecting portion connecting the first base portion to the second base portion,
   d. a clipping portion extending, directly or indirectly, from the first base portion, the clipping portion having at least two engagement faces biased away from each other to engage opposing regions of a third aperture of the first member by a tongue portion that curves away from, and then back to, the back surface so that the fastener is substantially prevented from being separated from the first member, such that the first stud and second stud can pass through respective apertures of the second member, and thereafter a first fastener can engage the first stud, and a second fastener can engage the second stud to secure the second member to the first member.

2. A rack fastener as claimed in claim 1 wherein at least one of the at least two engagement faces is located to extend through the third aperture.

3. A rack fastener as claimed in claim 1 wherein at least one of the two engagement faces is biased to interact with one or more of the first base portion or second base portion to retain the fastener to the first member.

4. A rack fastener as claimed in claim 1 wherein the third aperture is between the first aperture and the second aperture.

5. A rack fastener as claimed in claim 1 wherein the first stud and the second stud are elongate and threaded to receive the first fastener and second fastener respectively.

6. A rack fastener as claimed in claim 1 wherein the first stud and the second stud have reduced or no thread profile on their upper facing regions, at least when installed in the first member.

7. A rack fastener as claimed in claim 1 wherein the first base portion and the second base portion have a boss portion that engages into the first aperture and or second aperture respectively to limit movement of the fastener within a major plane of the first member and wherein the first stud extends from a first boss portion, and the second stud extends from a second boss portion, and wherein that part of the first stud and second stud, proximal their respective boss portions has no thread and is of increased diameter, compared to the threaded portion, the increased diameter to increase the strength of the studs where the second member will sit when engaged therewith and wherein the first base portion and or the second base portion include a peripheral skirt to lie outside a periphery of the first aperture and or second aperture, and against the back surface.

8. A rack fastener as claimed in claim 1 wherein the connecting portion is looped and has sufficient space to receive one or more fingers of a user therein to enable handling and attachment or removal of the fastener to the first member, and wherein a user can engage the tongue portion with their fingers to enable handling and attachment or removal of the fastener to the first member.

9. A rack fastener as claimed in claim 1 wherein the engagement faces have at least one extension to engage behind the back surface and or over the front surface of the first member, wherein the fastener can be disengaged from the first member by disengaging the, or at least one of the, engagement faces from its respective region.

10. A rack fastener as claimed in claim 1 wherein the fastener is dimensioned so as to fit the first aperture, second aperture or third aperture regardless of whether those apertures inner periphery is rectilinear or curved.

11. A rack fastener as claimed in claim 1 wherein the first member is part of a rack system, and the second member is a piece of equipment to be secured in the rack system and wherein the second member sits between the first member and the first and second fasteners.

12. A rack fastener as claimed in claim 1 wherein the clipping portion can be pinched by a user's fingers to engage and disengage the clipping portion from the third aperture, and wherein the clipping portion and or connecting portion forms a rearward facing surface of the fastener for a user to push and engage at least the clipping portion with the first member, and wherein the clipping portion has a contour on at least part of the rearward surface to indicate to a user an orientation of the rack fastener and wherein the first base portion and the second base portion also form part of the rearward facing surface.

13. A rack fastener as claimed in claim 1 wherein there is at least one reinforcing rib to strengthen the connection between the first base portion, second base portion and the connecting portion, the at least one reinforcing rib extends from a rear of the first base portion, second base portion and the connecting portion, away from the back surface, and the at least one reinforcing rib is on a periphery of the first base portion, second base portion and the connecting portion and wherein there are two reinforcing ribs.

14. A rack fastener as claimed in claim 1 wherein the first base portion, second base portion and the connecting portion present a planar surface to the back surface.

15. A rack fastener as claimed in claim 7 wherein the thread on the first stud and second stud only extends partway down, and there is a smooth surfaced portion between the thread and the boss portion.

16. A rack fastener as claimed in claim 7 wherein the first stud and second stud have their centre lines offset from a centre line of their respective boss portions.

17. A rack fastener as claimed in claim 1 wherein the tongue portion sits within an aperture between the first base portion, second base portion and the connecting portion, such that there is a free end containing at least one of the engagement faces, the free end able to move within the aperture to allow engagement to, and disengagement from, the first member.

18. A rack fastener as claimed in claim 1 wherein the other engagement face is on an extension of the tongue portion or clipping portion from the first base portion.

19. A rack fastener as claimed in claim 1 wherein the engagement faces are located on extensions of the clipping portion, the engagement faces include one or more reliefs to engage the third aperture, and the clipping portion has one or more returns on distal ends of the clipping portion, to over-engage the front surface of the third aperture.

* * * * *